(12) United States Patent
Akula et al.

(10) Patent No.: US 11,743,840 B2
(45) Date of Patent: Aug. 29, 2023

(54) POWER LIMIT DETERMINATION FOR CARRIER AGGREGATION WITH SHORTENED TRANSMISSION TIME INTERVALS

(71) Applicant: QUALCOMM Incorporated, San Diego, CA (US)

(72) Inventors: Prashanth Akula, San Diego, CA (US); Amir Farajidana, Sunnyvale, CA (US); Seyedkianoush Hosseini, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 693 days.

(21) Appl. No.: 15/987,393

(22) Filed: May 23, 2018

(65) Prior Publication Data

US 2018/0343624 A1 Nov. 29, 2018

Related U.S. Application Data

(60) Provisional application No. 62/511,906, filed on May 26, 2017.

(51) Int. Cl.
*H04W 52/36* (2009.01)
*H04W 72/0446* (2023.01)
*H04W 52/34* (2009.01)
*H04L 5/00* (2006.01)
*H04W 52/14* (2009.01)

(52) U.S. Cl.
CPC ........... *H04W 52/367* (2013.01); *H04L 5/001* (2013.01); *H04L 5/0078* (2013.01); *H04W 52/146* (2013.01); *H04W 52/34* (2013.01); *H04W 72/0446* (2013.01)

(58) Field of Classification Search
CPC . H04W 52/367; H04W 52/146; H04W 52/34; H04W 72/0446; H04L 5/001; H04L 5/0078

See application file for complete search history.

(56) References Cited

U.S. PATENT DOCUMENTS 10,455,610 B2 * 10/2019 Sun ................. H04L 5/0055
10,517,045 B2 * 12/2019 Wang .............. H04L 5/0053
(Continued)

*Primary Examiner* — Christopher M Crutchfield
*Assistant Examiner* — Tito Q Pham
(74) *Attorney, Agent, or Firm* — Holland & Hart LLP/Qualcomm Incorporated

(57) ABSTRACT

Methods, systems, and devices for wireless communication are described. Some wireless communications systems may support communication between a user equipment (UE) and a base station on multiple carriers (i.e., carrier aggregation). In some cases, the UE may be scheduled to transmit uplink signals on the different component carriers during transmission time intervals (TTIs) that have different durations. In such cases, it may be appropriate for the UE to determine a maximum transmit power limit relating to the amount of power used for the uplink transmissions on the multiple carriers. As described herein, the UE may identify one of the component carriers as a reference component carrier, and the UE may determine the maximum transmit power limit for a duration of a TTI associated with the reference component carrier. The UE may then transmit on the multiple carriers in compliance with the maximum transmit power limit.

4 Claims, 14 Drawing Sheets

(56) References Cited

U.S. PATENT DOCUMENTS

| | | | |
|---|---|---|---|
| 10,531,481 B2* | 1/2020 | Shao | H04W 52/146 |
| 2011/0280169 A1* | 11/2011 | Seo | H04W 72/0406 |
| | | | 370/311 |
| 2013/0272231 A1* | 10/2013 | Dinan | H04W 52/34 |
| | | | 370/329 |
| 2017/0223635 A1* | 8/2017 | Dinan | H04W 52/367 |
| 2018/0077719 A1* | 3/2018 | Nory | H04L 5/0042 |
| 2018/0213489 A1* | 7/2018 | Andou | H04W 52/38 |
| 2018/0249420 A1* | 8/2018 | Lim | H04W 52/367 |
| 2019/0068423 A1* | 2/2019 | Hwang | H04L 5/00 |
| 2019/0098622 A1* | 3/2019 | Lee | H04W 72/0446 |
| 2019/0174432 A1* | 6/2019 | Wang | H04W 52/365 |
| 2019/0373567 A1* | 12/2019 | Takeda | H04W 72/04 |
| 2020/0037255 A1* | 1/2020 | Liu | H04W 52/325 |

\* cited by examiner

POWER LIMIT DETERMINATION FOR CARRIER AGGREGATION WITH SHORTENED TRANSMISSION TIME INTERVALS

CROSS REFERENCES

The present Application for Patent claims the benefit of U.S. Provisional Patent Application No. 62/511,906 by AKULA, et al., entitled "POWER LIMIT DETERMINATION FOR CARRIER AGGREGATION WITH SHORTENED TRANSMISSION TIME INTERVALS," filed May 26, 2017, assigned to the assignee hereof, and expressly incorporated herein.

BACKGROUND

The following relates generally to wireless communication and more specifically to power limit determination for carrier aggregation with shortened transmission time intervals (sTTIs).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system).

A wireless multiple-access communications system may include a number of base stations or access network nodes, each simultaneously supporting communication for multiple communication devices, which may be otherwise known as user equipment (UE). Some wireless communications systems may support communication between a UE and a base station on multiple aggregated carriers, a feature referred to as carrier aggregation. In some cases, a UE may transmit uplink signals on different carriers during transmission time intervals (TTIs) having different durations. Additionally, the UE may transmit the uplink signals in accordance with a maximum transmit power limit. In such cases, however, it may be challenging for the UE to identify appropriate bounds for the maximum transmit power limit, and this may be detrimental to a wireless communications system.

SUMMARY

Some wireless communications systems may support communication between a user equipment (UE) and a base station on multiple aggregated carriers (i.e., carrier aggregation (CA)). In some cases, the UE may be scheduled to transmit uplink signals on the different component carriers (CCs) during transmission time intervals (TTIs) that have different durations. In such cases, it may be appropriate for the UE to determine a maximum transmit power limit relating to the amount of power used for the uplink transmissions on the multiple carriers. As described herein, the UE may identify one of the component carriers as a reference component carrier, and the UE may determine the maximum transmit power limit for a duration of a slot or TTI associated with the reference component carrier. The UE may then transmit on the multiple carriers in compliance with the maximum transmit power limit. In some instances, the maximum transmit power limit for a slot or TTI associated with the reference component carrier may be updated so as to guarantee that transmissions in compliance with an initial maximum transmit power limit for the slot or TTI are in compliance with an updated maximum transmit power limit for the slot or TTI.

A method of wireless communication at a UE is described. The method may include identifying that the UE is operating in a carrier aggregation mode that includes the use of at least a first component carrier that has a first TTI scheme and a second component carrier that has a second TTI scheme, at least one of the first TTI scheme or the second TTI scheme having a shortened TTI (sTTI), selecting one of the first component carrier or the second component carrier as a reference component carrier and the other of the first component carrier or the second component carrier as a non-reference component carrier based at least in part on durations of TTIs in the first TTI scheme and the second TTI scheme, determining a maximum UE transmit power limit for a duration of a slot, subframe, or sTTI in the reference component carrier based at least in part on a first sTTI of a plurality of sTTIs in the non-reference component carrier which overlap with the slot, subframe, or sTTI in the reference component carrier, and transmitting on the first component carrier and the second component carrier in compliance with the maximum UE transmit power limit.

An apparatus for wireless communication at a UE is described. The apparatus may include means for identifying that the UE is operating in a carrier aggregation mode that includes the use of at least a first component carrier that has a first TTI scheme and a second component carrier that has a second TTI scheme, at least one of the first TTI scheme or the second TTI scheme having a sTTI, means for selecting one of the first component carrier or the second component carrier as a reference component carrier and the other of the first component carrier or the second component carrier as a non-reference component carrier based at least in part on durations of TTIs in the first TTI scheme and the second TTI scheme, means for determining a maximum UE transmit power limit for a duration of a slot, subframe, or sTTI in the reference component carrier based at least in part on a first sTTI of a plurality of sTTIs in the non-reference component carrier which overlap with the slot, subframe, or sTTI in the reference component carrier, and means for transmitting on the first component carrier and the second component carrier in compliance with the maximum UE transmit power limit.

Another apparatus for wireless communication at a UE is described. The apparatus may include a processor, memory in electronic communication with the processor, and instructions stored in the memory. The instructions may be operable to cause the processor to identify that the UE is operating in a carrier aggregation mode that includes the use of at least a first component carrier that has a first TTI scheme and a second component carrier that has a second TTI scheme, at least one of the first TTI scheme or the second TTI scheme having a sTTI, select one of the first component carrier or the second component carrier as a reference component carrier and the other of the first component carrier or the second component carrier as a non-reference component carrier based at least in part on durations of TTIs in the first TTI scheme and the second TTI scheme, determine a maximum UE transmit power limit for a duration of a slot, subframe, or sTTI in the reference component carrier based at least in part on a first sTTI of a plurality of sTTIs in the non-reference component carrier which overlap with the slot, subframe, or sTTI in the reference component carrier, and transmit on the first component carrier and the second component carrier in compliance with the maximum UE transmit power limit.

A non-transitory computer readable medium at a UE for wireless communication is described. The non-transitory computer-readable medium may include instructions operable to cause a processor to identify that the UE is operating in a carrier aggregation mode that includes the use of at least a first component carrier that has a first TTI scheme and a second component carrier that has a second TTI scheme, at least one of the first TTI scheme or the second TTI scheme having a sTTI, select one of the first component carrier or the second component carrier as a reference component carrier and the other of the first component carrier or the second component carrier as a non-reference component carrier based at least in part on durations of TTIs in the first TTI scheme and the second TTI scheme, determine a maximum UE transmit power limit for a duration of a slot, subframe, or sTTI in the reference component carrier based at least in part on a first sTTI of a plurality of sTTIs in the non-reference component carrier which overlap with the slot, subframe, or sTTI in the reference component carrier and transmit on the first component carrier and the second component carrier in compliance with the maximum UE transmit power limit.

In some examples of the method, apparatus, and non-transitory computer-readable medium described above, selecting one of the first component carrier or the second component carrier as the reference component carrier includes selecting the reference component carrier based at least in part on a longest duration TTI of the first TTI scheme or of the second TTI scheme. In some examples of the method, apparatus, and non-transitory computer-readable medium described above, selecting one of the first component carrier or the second component carrier as the reference component carrier includes selecting a primary component carrier (PCC) as the reference component carrier based at least in part on the first TTI scheme including a two-symbol TTI and the second TTI scheme including a two-symbol TTI. In some examples of the method, apparatus, and non-transitory computer-readable medium described above, selecting one of the first component carrier or the second component carrier as the reference component carrier includes selecting a secondary component carrier (SCC) as the reference component carrier based at least in part on the first TTI scheme including a two-symbol TTI and the second TTI scheme including a two-symbol TTI.

In some examples of the method, apparatus, and non-transitory computer-readable medium described above, determining the maximum UE transmit power limit includes evaluating a first slot of the reference component carrier and the first sTTI of the non-reference component carrier, where the first slot of the reference component carrier and the first sTTI of the non-reference component carrier overlap in time. In some examples of the method, apparatus, and non-transitory computer-readable medium described above, evaluating the first slot of the reference component carrier and the first sTTI of the non-reference component carrier includes determining a sum of a first maximum UE transmit power limit for the first slot of the reference component carrier and a second maximum UE transmit power limit for the first sTTI of the non-reference component carrier, where the maximum UE transmit power limit may be the sum.

Some examples of the method, apparatus, and non-transitory computer-readable medium described above may further include processes, features, means, or instructions for updating the maximum UE transmit power limit by evaluating the first slot of the reference component carrier, the first sTTI of the non-reference component carrier, and additional sTTIs of the non-reference component carrier, where the first slot of the reference component carrier, the first sTTI of the non-reference component carrier, and the additional sTTIs of the non-reference component carrier each overlap in time.

In some examples of the method, apparatus, and non-transitory computer-readable medium described above, updating the maximum UE transmit power limit includes determining a first sum of a first maximum UE transmit power limit for the first slot of the reference component carrier and a second maximum UE transmit power limit for the first sTTI of the non-reference component carrier. Some examples of the method, apparatus, and non-transitory computer-readable medium described above may further include processes, features, means, or instructions for determining one or more second sums, each of the one or more second sums being of the first maximum UE transmit power limit for the first slot of the reference component carrier and an additional maximum UE transmit power limit for corresponding additional sTTIs of the non-reference component carrier. Some examples of the method, apparatus, and non-transitory computer-readable medium described above may further include processes, features, means, or instructions for determining a maximum sum of the first sum and the one or more second sums, where the maximum UE transmit power limit may be the maximum sum.

In some examples of the method, apparatus, and non-transitory computer-readable medium described above, determining the maximum UE transmit power limit includes evaluating a first sTTI of the reference component carrier and the first sTTI of the non-reference component carrier, where the first sTTI of the reference component carrier and the first sTTI of the non-reference component carrier overlap in time.

In some examples of the method, apparatus, and non-transitory computer-readable medium described above, evaluating the first sTTI of the reference component carrier and the first sTTI of the non-reference component carrier includes determining a sum of a first maximum UE transmit power limit for the first sTTI of the reference component carrier and a second maximum UE transmit power limit for the first sTTI of the non-reference component carrier, where the maximum UE transmit power limit may be the sum. Some examples of the method, apparatus, and non-transitory computer-readable medium described above may further include processes, features, means, or instructions for updating the maximum UE transmit power limit by evaluating the first sTTI of the reference component carrier, the first sTTI of the non-reference component carrier, and additional sTTIs of the non-reference component carrier, where the first sTTI of the reference component carrier, the first sTTI of the non-reference component carrier, and the additional sTTIs of the non-reference component carrier each overlap in time.

In some examples of the method, apparatus, and non-transitory computer-readable medium described above, updating the maximum UE transmit power limit includes determining a first sum of a first maximum UE transmit power limit for the first sTTI of the reference component carrier and a second maximum UE transmit power limit for the first sTTI of the non-reference component carrier. Some examples of the method, apparatus, and non-transitory computer-readable medium described above may further include processes, features, means, or instructions for determining one or more second sums, each of the one or more second sums being of the first maximum UE transmit power limit for the first sTTI of the reference component carrier and an additional maximum UE transmit power limit for corresponding additional sTTIs of the non-reference component carrier. Some examples of the method, apparatus, and non-transitory computer-readable medium described above may further include processes, features, means, or instructions for determining a maximum sum of the first sum and the one or more second sums, where the maximum UE transmit power limit may be the maximum sum.

In some examples of the method, apparatus, and non-transitory computer-readable medium described above, the reference component carrier includes TTIs that may be longer in duration than TTIs in the non-reference component carrier. In some examples of the method, apparatus, and non-transitory computer-readable medium described above, the reference component carrier includes a seven-symbol TTI or a one millisecond TTI and the non-reference component carrier includes a two-symbol TTI.

In some examples of the method, apparatus, and non-transitory computer-readable medium described above, the reference component carrier includes a two-symbol TTI and the non-reference component carrier includes a two-symbol TTI. In some examples of the method, apparatus, and non-transitory computer-readable medium described above, the first component carrier and the second component carrier may be time-aligned. In some examples of the method, apparatus, and non-transitory computer-readable medium described above, the first component carrier and the second component carrier may be not time-aligned.

DETAILED DESCRIPTION

Figure 1:
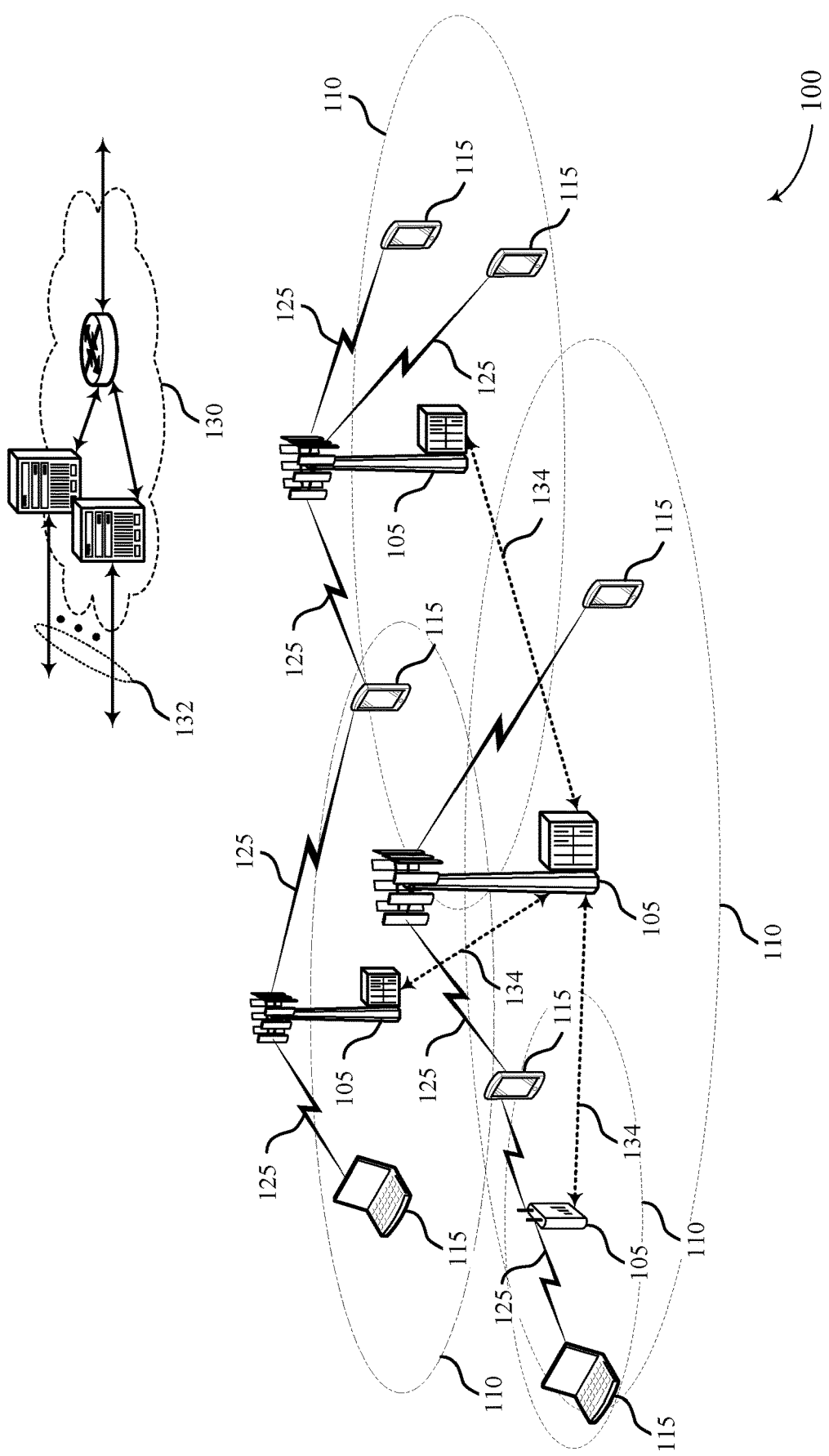
FIG. 1 illustrates an example of a wireless communications system that supports power limit determination for carrier aggregation with shortened transmission time intervals (sTTIs) in accordance with aspects of the present disclosure.

Some wireless communications systems may support communication between a user equipment (UE) and a base station on multiple aggregated component carriers (CCs), a feature referred to as carrier aggregation. In some cases, the UE may be configured with a maximum transmit power limit for uplink transmissions during transmission time intervals (TTIs) on the multiple carriers, and the UE may refrain from transmitting with a transmit power above this limit during the corresponding TTIs. In some examples, for uplink transmissions on multiple carriers, the UE may determine the maximum transmit power limit by summing the maximum transmit power limits for each overlapping TTI on the multiple carriers.

The UE may determine the maximum transmit power limit such that the maximum transmit power limit falls within specific bounds. Specifically, the UE may identify an upper and lower bound for the maximum transmit power limit, and the UE may determine the maximum transmit power limit such that the maximum transmit power falls within these bounds. Similar to the techniques described above, the UE may determine the upper bound for the maximum transmit power limit based on summing the upper bounds associated with overlapping TTIs on the multiple carriers, and the UE may determine the lower bound for the maximum transmit power limit based on summing the lower bounds associated with overlapping TTIs on the multiple carriers.

In some cases, a TTI allocated for uplink transmissions on a first carrier may span multiple TTIs (e.g., shortened TTIs (sTTIs)) allocated for uplink transmissions on a second carrier. In such cases, if the UE determines different bounds for the maximum transmit power limit for each sTTI on the second carrier, the maximum transmit power limit for uplink transmissions may change for each sTTI on the second carrier that overlaps with the TTI on the first carrier. Accordingly, the transmit power used for an uplink transmission during the TTI on the first carrier may change and the uplink transmission may be distorted, resulting in reduced throughput in a wireless communications system.

Some wireless communications systems may support techniques for configuring a UE to determine constant bounds for the maximum transmit power limit over an interval when TTIs on different carriers overlap. The maximum transmit power threshold can be ascertained prior to the arrival of the overlapping TTIs to which it applies. In some examples, a UE may be configured to determine constant bounds for the maximum transmit power limit during a TTI (e.g., slot or subframe) on the first carrier since the duration of this TTI may be longer than the durations of sTTIs on the second carrier. In other examples, the interval for which the bounds may be kept constant may be variable (e.g., predetermined for a TTI or sTTI prior to the TTI or sTTI).

In any case, once the UE identifies the TTI (e.g., on the first carrier) for which the bounds may be kept constant, the UE may sum the lower bounds of the limit for each sTTI on the second carrier and the lower bound of the limit for the TTI on the first carrier to determine a range of values for the lower bound of the limit. Similarly, the UE may sum the upper bounds of the limit for each sTTI on the second carrier and the upper bound of the limit for the TTI on the first carrier to determine a range of values for the upper bound of the limit. The UE may then select the lowest sum of the lower bounds as the lower bound for the limit for the uplink transmission on the multiple carriers, and the UE may select the highest sum of the upper bounds as the upper bound for the limit for the uplink transmission on the multiple carriers.

Accordingly, the bounds of the maximum transmit power limit may be constant. In some cases, however, the UE may not be able to receive and decode an indication of the bounds of the limit for an sTTI prior to an uplink transmission during the TTI on the first carrier. For example, the UE may receive an indication of the bounds of the limit for an sTTI spanned by the TTI in advance of the uplink transmission scheduled during the sTTI. However, the UE may not be able to decode the indication before the uplink transmission during the TTI on the first carrier. As a result, the UE may not be able to determine the bounds for the maximum transmit power limit before the start of the TTI on the first carrier, and, as discussed above, this may result in reduced throughput in a wireless communications system.

As described herein, a wireless communications system may support efficient techniques for determining the bounds of a maximum transmit power limit across carriers in carrier aggregation to allow a UE to maintain a constant transmit power when transmissions on its component carriers overlap in time. Specifically, the UE may determine the bounds for the maximum transmit power limit for an uplink transmission on multiple carriers for each sTTI at the boundary of the sTTI. Further, the UE may be configured to only widen the bounds at each sTTI of the second carrier within the TTI of the first carrier in order to ensure that the maximum transmit power limit remains within the bounds. Because the UE may determine the bounds at the boundaries of each sTTI, the UE may have sufficient time to determine the bounds of the limit during each sTTI on the second carrier.

Aspects of the disclosure introduced above are described below in the context of a wireless communications system. Examples of processes and signaling exchanges that support power limit determination for carrier aggregation with sTTIs are then described. Aspects of the disclosure are further illustrated by and described with reference to apparatus diagrams, system diagrams, and flowcharts that relate to power limit determination for carrier aggregation with sTTIs.

FIG. 1 illustrates an example of a wireless communications system 100 that supports power limit determination for carrier aggregation with sTTIs in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

Time intervals in LTE or NR may be expressed in multiples of a basic time unit (which may be a sampling period of $T_s=1/30,720,000$ seconds). Time resources may be organized according to radio frames of length of 10 ms ($T_f=307200$ $T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs (such as an sTTI).

In wireless communications system 100, a TTI may be defined as the smallest unit of time in which a base station 105 may schedule a UE 115 for uplink or downlink transmissions. As an example, a base station 105 may allocate one or more TTIs for downlink communication with a UE 115. The UE 115 may then monitor the one or more TTIs to receive downlink signals from the base station 105. In some wireless communications systems (e.g., LTE), a subframe may be the basic unit of scheduling or TTI. In other cases, such as with low latency operation, a different, reduced-duration TTI (e.g., an sTTI) may be used (e.g., a mini-slot). For example, an sTTI may be one symbol, two symbols, or a mini-slot. Wireless communications system 100 may employ various TTI durations, including those that facilitate ultra-reliable low-latency communications (URLLC) and mobile broadband (MBB) communications, in addition to other types of communication associated with LTE and NR.

A resource element may consist of one symbol period and one subcarrier (e.g., a 15 KHz frequency range). In some cases, the numerology employed within a system (i.e., symbol size, subcarrier size, symbol-period duration, or TTI duration) may be selected or determined based on a type of communication. The numerology may be selected or determined in view of an inherent tradeoff between latency for low latency applications and efficiency for other applications, for example. In some cases, the duration of time slots allocated for MBB communications may be greater than the duration of time slots allocated for URLLC. Time slots allocated for URLLC may be referred to as mini-slots.

Wireless communications system 100 may support operation on multiple cells or carriers, a feature which may be referred to as carrier aggregation or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink component carriers and one or more uplink component carriers for carrier aggregation. In some cases, wireless communications system 100 may utilize enhanced component carriers (eCCs).

An enhanced component carrier may be characterized by one or more features including: wider bandwidth, shorter symbol duration, shorter TTIs, and modified control channel configuration. In some cases, an enhanced component carrier may be associated with a carrier aggregation configuration or a dual connectivity configuration (e.g., when multiple serving cells have a suboptimal or non-ideal backhaul link). An enhanced component carrier characterized by wide bandwidth may include one or more segments that may be utilized by UEs 115 that are not capable of monitoring the whole bandwidth or prefer to use a limited bandwidth (e.g., to conserve power).

In some cases, an enhanced component carrier may utilize a different symbol duration than other component carriers, which may include use of a reduced symbol duration as compared with symbol durations of other component carriers. A shorter symbol duration is associated with increased subcarrier spacing. A device, such as a UE 115 or base station 105, communicating on enhanced component carriers may transmit wideband signals (e.g., 20, 40, 60, 80 MHz, etc.) at reduced symbol durations (e.g., 16.67 microseconds). A duration of a TTI used for communication on an enhanced component carrier may be variable, and the TTI may consist of one or multiple symbols.

In wireless communications system 100, a UE 115 may simultaneously communicate on multiple carriers using TTIs having different durations. In such cases, it may be challenging for the UE to determine appropriate upper and lower bounds for a maximum transmit power limit used for uplink transmissions during the different TTIs. As such, the transmit power used for transmissions on one carrier may vary during a TTI, and this may result in distortion of an uplink transmission which may be detrimental to a wireless communications system. Wireless communications system 100 may support efficient techniques for identifying the upper and lower bounds for a maximum transmit power limit used for uplink transmissions during TTIs having different durations.

Figure 2:
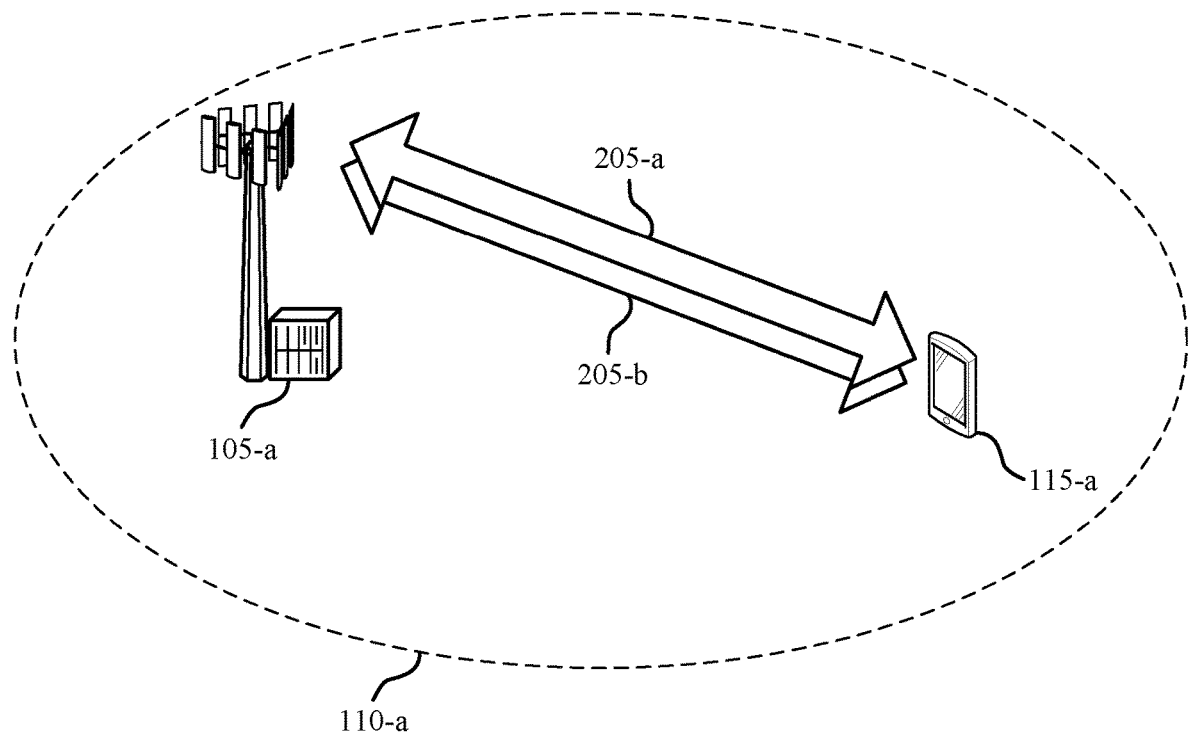
FIG. 2 illustrates an example of a wireless communications system that supports power limit determination for carrier aggregation with sTTIs in accordance with aspects of the present disclosure.

FIG. 2 illustrates an example of a wireless communications system 200 that supports power limit determination for carrier aggregation with sTTIs in accordance with various aspects of the present disclosure. Wireless communications system 200 may include base station 105-a and UE 115-a, which may be examples of a base station 105 and a UE 115 described with reference to FIG. 1. In some examples, base station 105-a may be in communication with one or more UEs 115 within geographic coverage area 110-a. Wireless communications system 200 may implement aspects of wireless communications system 100. For example, wireless communications system 200 may support carrier aggregation, and base station 105-a may communicate with UE 115-a on resources of multiple carriers 205. In some cases, the duration of the TTIs used for communication on carriers 205-a and 205-b may be different.

Figure 3:
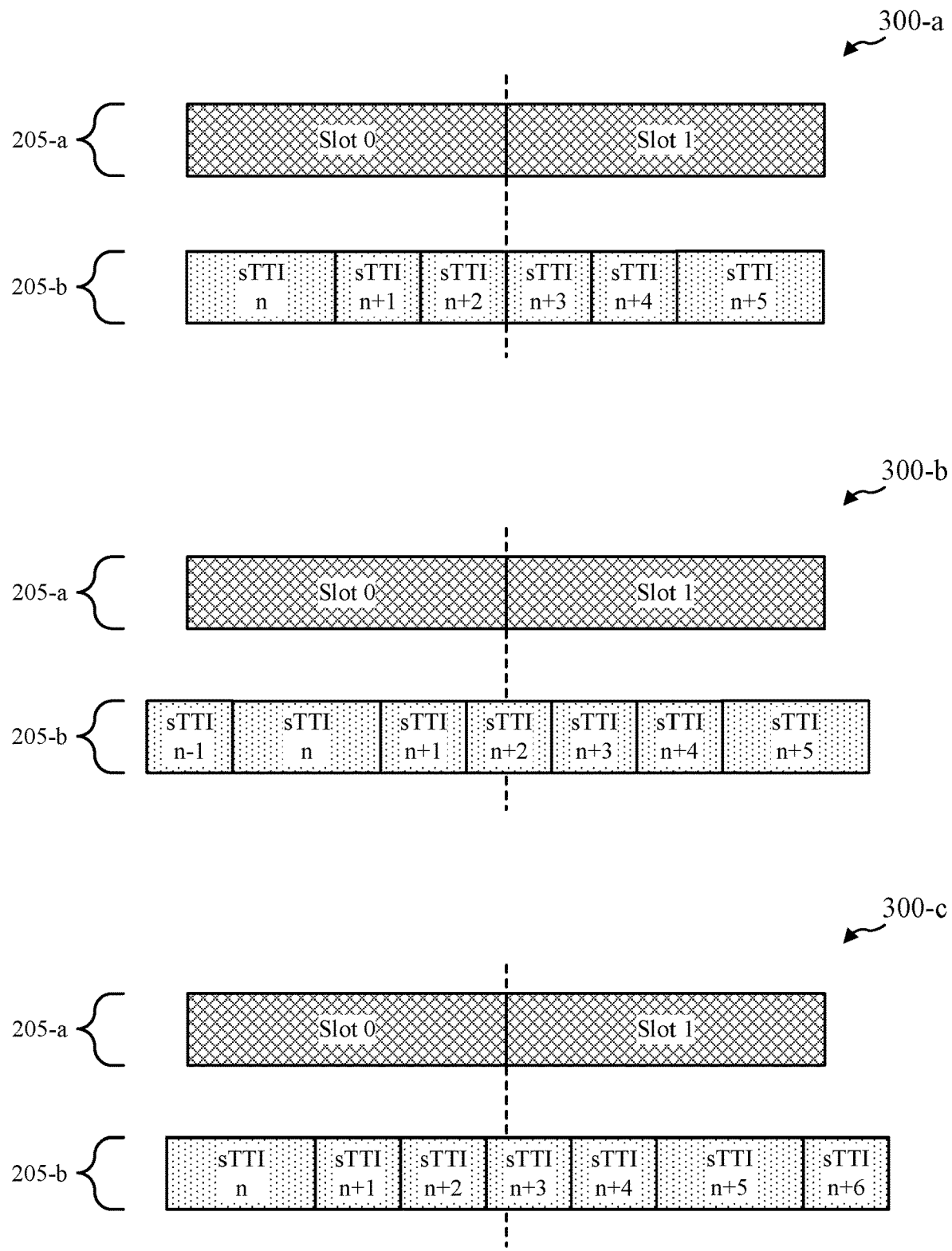
FIG. 3 illustrates an example of transmission time intervals (TTIs) used for communication on multiple carriers in accordance with aspects of the present disclosure.

FIG. 3 illustrates an example of TTIs 300 used for communication on carriers 205. In the examples illustrated in FIG. 3, the TTIs on a first component carrier are of a different length than the TTIs on a second component carrier. Thus, and for example, the TTIs of a first component carrier may be one millisecond TTIs or may extend up to seven symbol periods (e.g., a slot). The TTIs of a second component carrier may be examples of sTTIs, and may extend either two or three symbol periods.

In one example, UE 115-a may communicate with base station 105-a during TTIs 300-a, and the TTIs used for uplink transmissions on carriers 205-a and 205-b may be aligned. That is, the boundaries of the TTI (or sTTIs) used for uplink transmissions on carrier 205-a may align with boundaries of sTTIs used for uplink transmissions on carrier 205-b. In another example, UE 115-a may communicate with base station 105-b during TTIs 300-b, and the TTIs used for uplink transmissions on carrier 205-b may "lag" the TTIs used for uplink transmissions on carrier 205-b. In yet another example, UE 115-a may communicate with base station 105-b during TTIs 300-c, and the TTIs used for uplink transmissions on carrier 205-b may "lead" the TTIs used for uplink transmissions on carrier 205-b.

For all of the examples described above with reference to FIG. 3, the techniques described herein may allow UE 115-a to maintain the maximum transmit power limit during a TTI on one carrier (e.g., a primary component carrier (PCC) 205-a which may be referred to as a reference carrier) which overlaps with or spans multiple TTIs on another carrier (e.g., a secondary component carrier (SCC) 205-b). Although the following example is described with reference to TTIs 300-c, the techniques described may also apply to communication on carriers 205 during the TTIs 300-a and 300-b.

In the example introduced above, UE 115-a may be scheduled to transmit uplink signals during a TTI (e.g., slot 0 or a subframe including slot 0 and slot 1) on carrier 205-*a* and during multiple sTTIs on carrier 205-*b*. As illustrated, the TTI on carrier 205-*a* may span multiple sTTIs on carrier 205-*b*. In such cases, it may be desirable to maintain a constant transmit power for the uplink transmissions on both carriers 205 for the duration of the uplink transmission on carrier 205-*a*, since a varying limit may cause the uplink transmission on carrier 205-*a* to be distorted. In this example, carrier 205-*a* may be referred to as a reference carrier. UE 115-*a* may select carrier 205-*a* as the reference carrier since carrier 205-*a* may be associated with longer TTI durations than carrier 205-*b*.

UE 115-*a* may determine the maximum transmit power limit such that the limit falls within specific bounds. As an example, UE 115-*a* may receive an indication of the bounds for the maximum transmit power limit for each TTI on each carrier prior to transmitting uplink signals during the corresponding TTI. For example, UE 115-*a* may receive an indication of upper and lower bounds for the maximum transmit power limit for a TTI on carrier 205-*a* and other indications of upper and lower bounds for the maximum transmit power limit for each sTTI on carrier 205-*b*. In some cases, UE 115-*a* may receive the indication of the bounds for the maximum transmit power limit for an sTTI on carrier 205-*b* in a previous sTTI on carrier 205-*b* (e.g., in an uplink grant). In one example, UE 115-*a* may receive the indication of the bounds for an sTTI n in an sTTI n−4 on carrier 205-*b*.

To determine the bounds for uplink transmissions across multiple carriers, the UE 115-*a* may sum the bounds associated with the TTIs overlapping on the multiple carriers. For example, UE 115-*a* may sum the bounds associated with slot 0 and sTTI n to determine the bounds for uplink transmissions during the overlapping portions of these TTIs. However, since the bounds associated with sTTI n+1 may be different from the bounds associated with sTTI n, the bounds for the uplink transmissions on the multiple carriers may change across these TTIs. As a result, the maximum transmit power limit may change during the uplink transmission on carrier 205-*a* and this may cause the uplink transmission to be distorted.

Wireless communications system 200 may support efficient techniques for maintaining the maximum transmit power limit for the duration of the uplink transmission on carrier 205-*a*. Specifically, UE 115-*a* may determine initial bounds for the uplink transmissions on carriers 205 for the duration of the uplink transmission on carrier 205-*a* based on summing the bounds associated with slot 0 and sTTI n. Then, for subsequent sTTIs within the duration of the uplink transmission on carrier 205-*a*, UE 115-*a* may refrain from narrowing the bounds so that the maximum transmit power limit may remain within the bounds for the duration of the uplink transmission.

As an example, UE 115-*a* may determine the upper bound for the uplink transmissions on carriers 205 during a subsequent sTTI prior to an uplink transmission during the sTTI (e.g., at the boundary of the sTTI). If the upper bound is greater than the initial (or previous) upper bound, UE 115-*a* may update the upper bound of the limit. Alternatively, if the upper bound is less than or equal to the initial (or previous) upper bound, UE 115-*a* may maintain the initial (or previous) upper bound. Accordingly, the maximum transmit power limit may fall within the determined bounds for the duration of the uplink transmission on carrier 205-*a*.

Similarly, UE 115-*a* may determine the lower bound for the uplink transmissions on carriers 205 during a subsequent sTTI prior to an uplink transmission during the sTTI (e.g., at the boundary of the sTTI). If the lower bound is less than the initial (or previous) lower bound, UE 115-*a* may update the lower bound of the limit. Alternatively, if the lower bound is greater than or equal to the initial (or previous) lower bound, UE 115-*a* may maintain the initial (or previous) lower bound. Accordingly, the maximum transmit power limit may fall within the determined bounds for the duration of the uplink transmission on carrier 205-*a*.

In both examples provided above for determining the upper and lower bounds for the uplink transmissions on carriers 205, UE 115-*a* may adjust the upper and lower bounds at the boundaries of sTTIs on carrier 205-*b*. Thus, using these techniques, if the UE 115-*a* receives an indication of the upper and lower bounds in a previous sTTI (e.g., sTTI n−4) for uplink transmissions in a current sTTI (e.g., sTTI n), the UE 115 may have sufficient time to decode the indication and identify the upper and lower bounds included in the indication, because the determination of the upper and lower bounds for the entirety of the TTI on carrier 205-*a* need not be initially based on knowledge of the upper and lower bounds of all of the overlapping sTTIs on carrier 205-*b*. Accordingly, these techniques may be beneficial when compared to other techniques where the UE 115 may have to decode the indication of the upper and lower bounds in an sTTI on carrier 205-*b* prior to a TTI on carrier 205-*a*, since, in some cases, this may not be possible.

Figure 4:
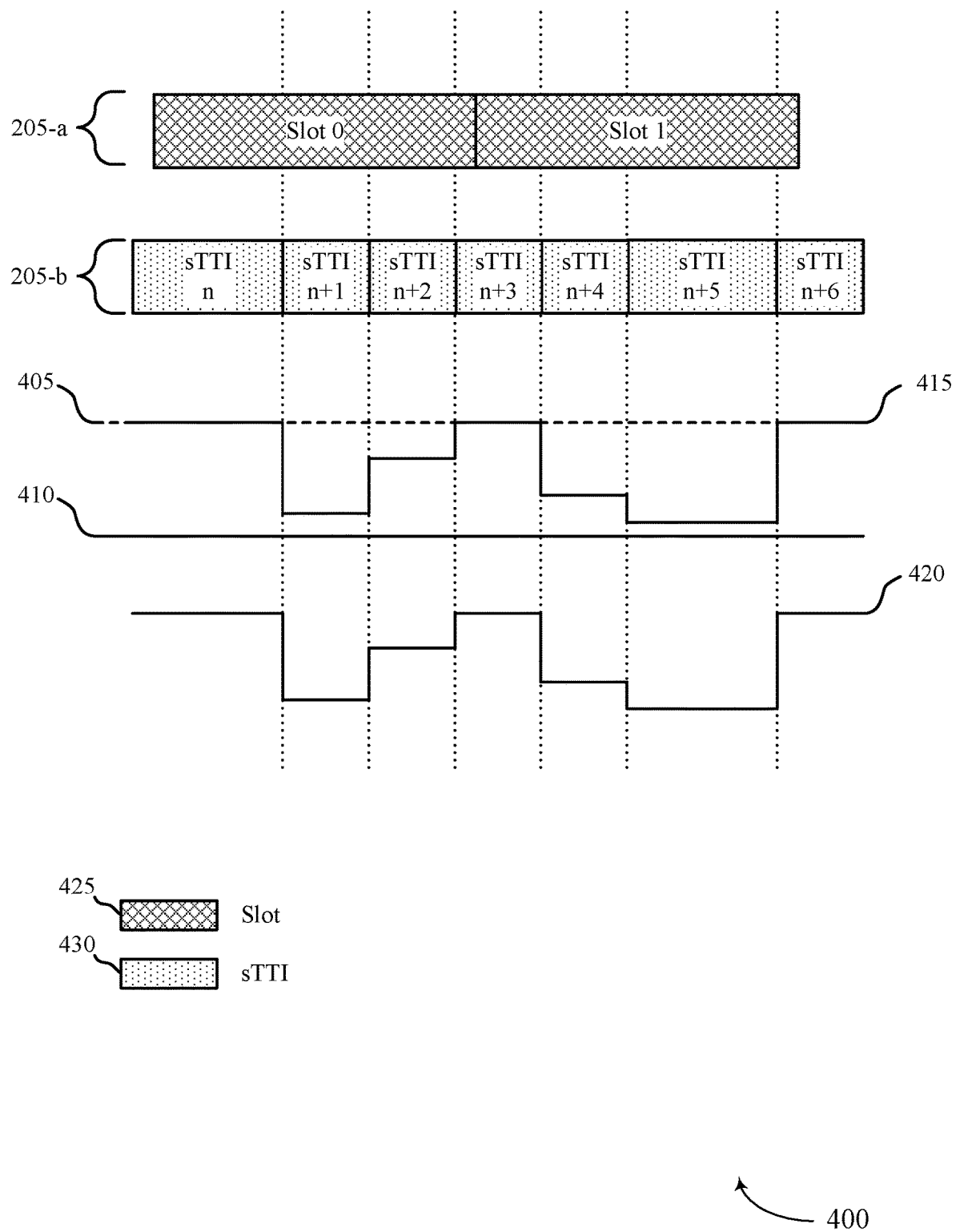
FIG. 4 illustrates multiple graphs showing the upper bounds for a maximum transmit power limit configured for uplink transmissions on multiple carriers in accordance with aspects of the present disclosure.

FIG. 4 illustrates multiple graphs 400 showing the upper bounds for a maximum transmit power limit configured for uplink transmissions on multiple carriers. Graph 420 illustrates example upper bounds for the maximum transmit power limit across sTTIs 430, and graph 410 illustrates an example of the upper bounds for the maximum transmit power limit across slots 425. UE 115-*a* may receive an indication from base station 105-*a* of the upper bound for the maximum transmit power limit during a TTI prior to transmitting during the TTI. To determine the upper bounds for the uplink transmissions on both carriers 205, UE 115-*a* may sum the upper bounds for overlapping TTIs on the carriers 205. Graph 415 (illustrated as a solid line) illustrates the upper bounds for the maximum transmit power limit for uplink transmissions on carriers 205 (i.e., the sum of graphs 410 and 420).

As shown in graph 415 (illustrated with a solid line), the upper bounds for the maximum transmit power limit may vary within a slot on carrier 205-*a*. However, as discussed above, adjusting the bounds of a maximum transmit power limit at each sTTI on carrier 205-*b* may cause an uplink transmission on carrier 205-*a* to be distorted. The techniques described herein may allow UE 115-*a* to maintain a maximum transmit power limit since the UE 115-*a* may only increase the upper bound for the limit for the duration of an uplink transmission on carrier 205-*a*. Graph 405 (illustrated as a dashed, horizontal line) illustrates the upper bounds for the limit across the sTTIs on carrier 205-*b* in accordance with the techniques described herein. In the present example, UE 115-*a* may determine an initial upper bound based on summing the upper bound for slot 0 and the upper bound for sTTI n, and the UE 115-*a* may maintain this upper bound across the sTTIs on carrier 205-*b*. In other examples, the UE 115-*a* may increase the upper bound at the boundary of a subsequent sTTI on carrier 205-*b* after determining the initial upper bound if the sum of an upper bound for the subsequent sTTI on carrier 205-*b* and an upper bound for the TTI on carrier 205-*a* is determined to be greater than the initial upper bound.

Figure 5:
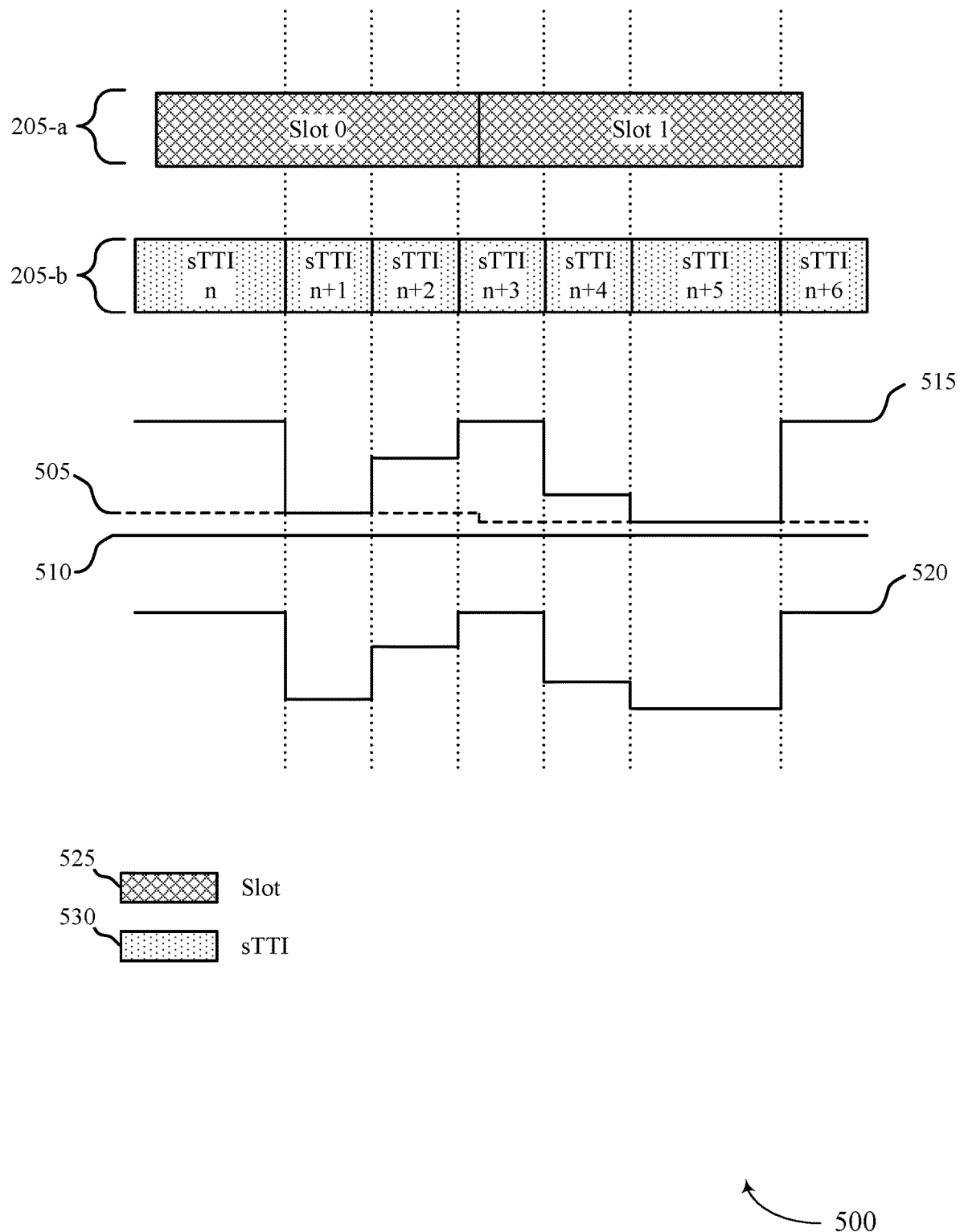
FIG. 5 illustrates multiple graphs showing the lower bounds for a maximum transmit power limit configured for uplink transmissions on multiple carriers in accordance with aspects of the present disclosure.

FIG. 5 illustrates multiple graphs 500 showing the lower bounds for a maximum transmit power limit configured for uplink transmissions on multiple carriers. Graph 520 illustrates example lower bounds for the maximum transmit power limit across sTTIs 530, and graph 510 illustrates example lower bounds for the maximum transmit power limit across slots 525. UE 115-a may receive an indication from base station 105-a of the lower bound for the maximum transmit power limit during a TTI prior to transmitting during the TTI. To determine the lower bounds for the uplink transmissions on both carriers 205, UE 115-a may sum the lower bounds for overlapping TTIs on the carriers 205. Graph 515 illustrates the lower bounds for the maximum transmit power limit for uplink transmissions on carriers 205 (i.e., the sum of graphs 510 and 520).

As shown in graph 515, the lower bounds for the maximum transmit power limit may vary within a slot on carrier 205-a. However, as discussed above, this may cause an uplink transmission on carrier 205-a to be distorted. The techniques described herein may allow UE 115-a to maintain a maximum transmit power limit since the UE 115-a may only decrease the lower bound for the limit for the duration of an uplink transmission on carrier 205-a. Graph 505 illustrates the lower bounds for the limit across the sTTIs on carrier 205-b in accordance with the techniques described herein. In the present example, UE 115-a may determine an initial lower bound based on summing the lower bound for slot 0 and the lower bound for sTTI n, and the UE 115-a may maintain this lower bound across the sTTIs on carrier 205-b during slot 0. In slot 1, UE 115-a may determine that a subsequent lower bound (e.g., during sTTI n+5) is less than the initial (or previous) lower bound, and the UE 115-a may decrease the lower bound for the limit.

Figure 6:
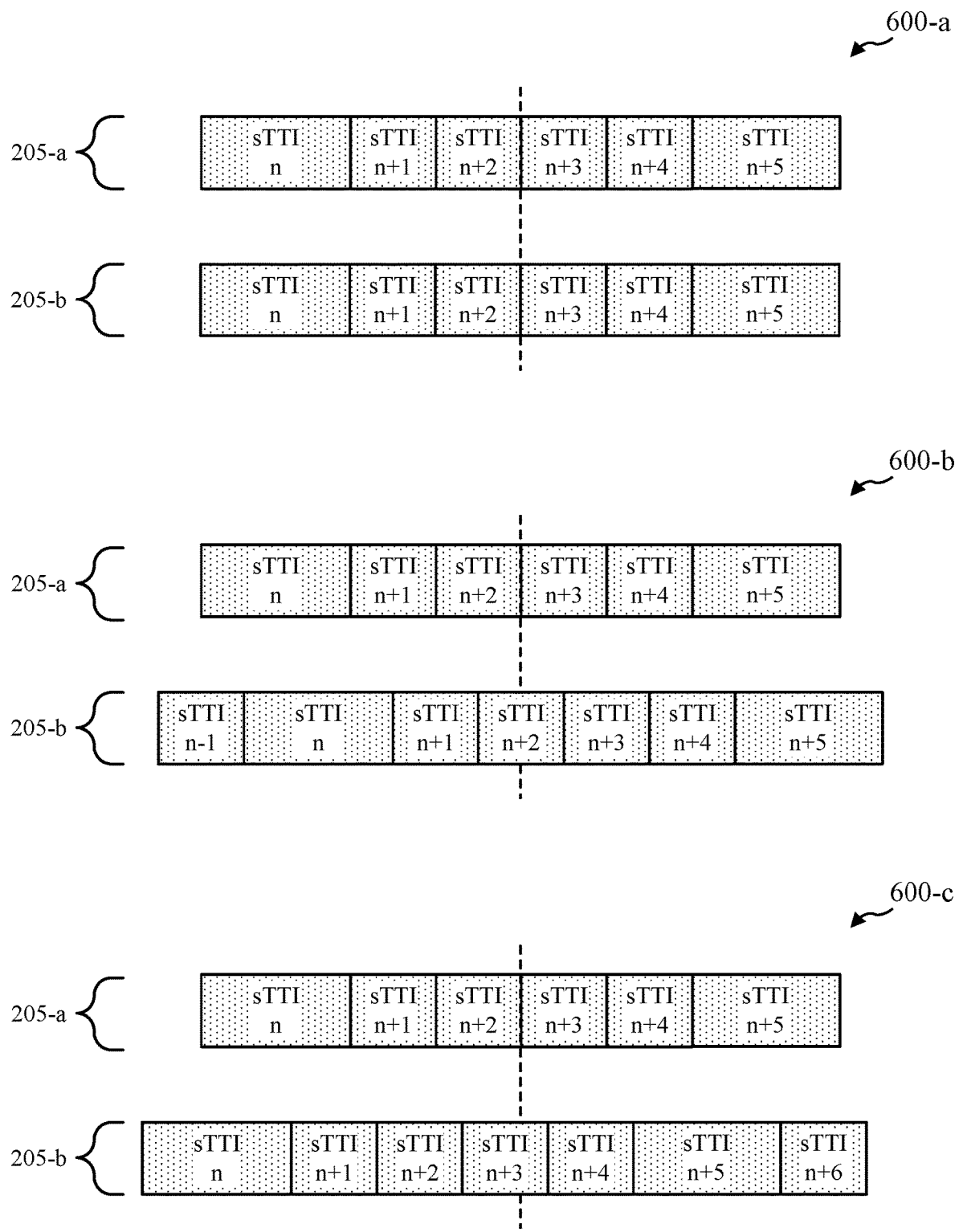
FIG. 6 illustrates an example of TTIs used for communication on multiple carriers in accordance with aspects of the present disclosure.

FIG. 6 illustrates an example of sTTIs 600 used for communication on carriers 205. In the examples illustrated in FIG. 6, the TTIs on both a first component carrier and a second component carrier are sTTIs. Thus, and for example, the TTIs of the first and the second component carriers may extend either two or three symbol periods.

In one example, UE 115-a may communicate with base station 105-a during sTTIs 300-a, and the TTIs used for uplink transmissions on carriers 205-a and 205-b may be aligned. That is, the boundaries of the sTTIs used for uplink transmissions on carrier 205-a may align with boundaries of sTTIs used for uplink transmissions on carrier 205-b. In another example, UE 115-a may communicate with base station 105-b during sTTIs 300-b, and the sTTIs used for uplink transmissions on carrier 205-b may "lag" the sTTIs used for uplink transmissions on carrier 205-b. In yet another example, UE 115-a may communicate with base station 105-b during sTTIs 300-c, and the sTTIs used for uplink transmissions on carrier 205-b may "lead" the sTTIs used for uplink transmissions on carrier 205-b.

For all of the examples described above with reference to FIG. 6, the techniques described herein may allow UE 115-a to maintain the maximum transmit power limit during an sTTI on one carrier (e.g., a PCC 205-a which may be referred to as a reference carrier) and across multiple sTTIs on another carrier (e.g., a SCC 205-b). Although the following example is described with reference to sTTIs 600-b, the techniques described may also apply to communication on carriers 205 during the sTTIs 600-a and 600-c. Further, although the following example describes maintaining the maximum transmit power limit during an sTTI (i.e., a reference interval) on carrier 205-a (i.e., a reference carrier), the techniques described herein apply to maintaining a maximum transmit power limit during multiple sTTIs, one or more slots, or one or more subframes.

In the example introduced above, UE 115-a may be scheduled to transmit uplink signals during multiple sTTIs on carrier 205-a and during multiple sTTIs on carrier 205-b. As illustrated, an sTTI on carrier 205-a may overlap with multiple sTTIs on carrier 205-b. In such cases, it may be desirable to maintain a constant transmit power for the uplink transmissions on both carriers 205 for the duration of the uplink transmission on carrier 205-a, since a varying limit may cause the uplink transmission on carrier 205-a to be distorted. In this example, carrier 205-a may be referred to as a reference carrier. However, in other examples UE 115-a may select carrier 205-b as the reference carrier.

UE 115-a may determine the maximum transmit power limit such that the limit falls within specific bounds. As an example, UE 115-a may receive an indication of the bounds for the maximum transmit power limit for each sTTI on each carrier prior to transmitting uplink signals during the corresponding sTTI. For example, UE 115-a may receive indications of upper and lower bounds for the maximum transmit power limit for each sTTI on carrier 205-a and for each sTTI on carrier 205-b.

To determine the bounds for uplink transmissions across multiple carriers, the UE 115-a may sum the bounds associated with the sTTIs overlapping on the multiple carriers. For example, UE 115-a may sum the bounds associated with sTTI n on carrier 205-a and sTTI n−1 on carrier 205-b to determine the bounds for uplink transmissions during the overlapping portions of these TTIs. However, since the bounds associated with sTTI n may be different from the bounds associated with sTTI n−1 on carrier 205-b, the bounds for the uplink transmissions on the multiple carriers may change across these sTTIs. As a result, the maximum transmit power limit may change during the uplink transmission on carrier 205-a and this may cause the uplink transmission during sTTI n to be distorted.

Wireless communications system 200 may support efficient techniques for maintaining the maximum transmit power limit for the duration of the uplink transmission on carrier 205-a during sTTI n. Specifically, UE 115-a may determine initial bounds for the uplink transmissions on carriers 205 for the duration of the uplink transmission on carrier 205-a based on summing the bounds associated with sTTI n on carrier 205-a and sTTI n−1 on carrier 205-b. Then, for subsequent sTTIs within the duration of the uplink transmission on carrier 205-a (i.e., spanned by sTTI n on carrier 205-a), UE 115-a may refrain from narrowing the bounds so that the maximum transmit power limit may remain within the bounds for the duration of the uplink transmission.

As an example, UE 115-a may determine the upper bound for the uplink transmissions on carriers 205 during a subsequent sTTI prior to an uplink transmission during the sTTI (e.g., at the boundary of the sTTI) on carrier 205-b. If the upper bound is greater than the initial (or previous) upper bound, UE 115-a may update the upper bound of the limit. Alternatively, if the upper bound is less than or equal to the initial (or previous) upper bound, UE 115-a may maintain the initial (or previous) upper bound. Accordingly, the maximum transmit power limit may fall within the determined bounds for the duration of the uplink transmission on carrier 205-a.

Similarly, UE 115-a may determine the lower bound for the uplink transmissions on carriers 205 during a subsequent sTTI prior to an uplink transmission during the sTTI (e.g., at the boundary of the sTTI) on carrier 205-b. If the lower bound is less than the initial (or previous) lower bound, UE 115-a may update the lower bound of the limit. Alternatively, if the lower bound is greater than or equal to the initial (or previous) lower bound, UE 115-a may maintain the initial (or previous) lower bound. Accordingly, the maximum transmit power limit may fall within the determined bounds for the duration of the uplink transmission on carrier 205-*a*.

In both examples provided above for determining the upper and lower bounds for the uplink transmissions on carriers 205, UE 115-*a* may adjust the upper and lower bounds at the boundaries of sTTIs on carrier 205-*b*. Thus, using these techniques, if the UE 115-*a* receives an indication of the upper and lower bounds in a previous sTTI (e.g., sTTI n−4) for uplink transmissions in a current sTTI (e.g., sTTI n), the UE 115 may have sufficient time to decode the indication and identify the upper and lower bounds included in the indication, because the determination of the upper and lower bounds for the entirety of the sTTI on carrier 205-*a* need not be initially based on knowledge of the upper and lower bounds of all of the overlapping sTTIs on carrier 205-*b*. Accordingly, these techniques may be beneficial when compared to other techniques where the UE 115 may have to decode the indication of the upper and lower bounds in an sTTI on carrier 205-*b* prior to an sTTI on carrier 205-*a*, since, in some cases, this may not be possible.

Figure 7:
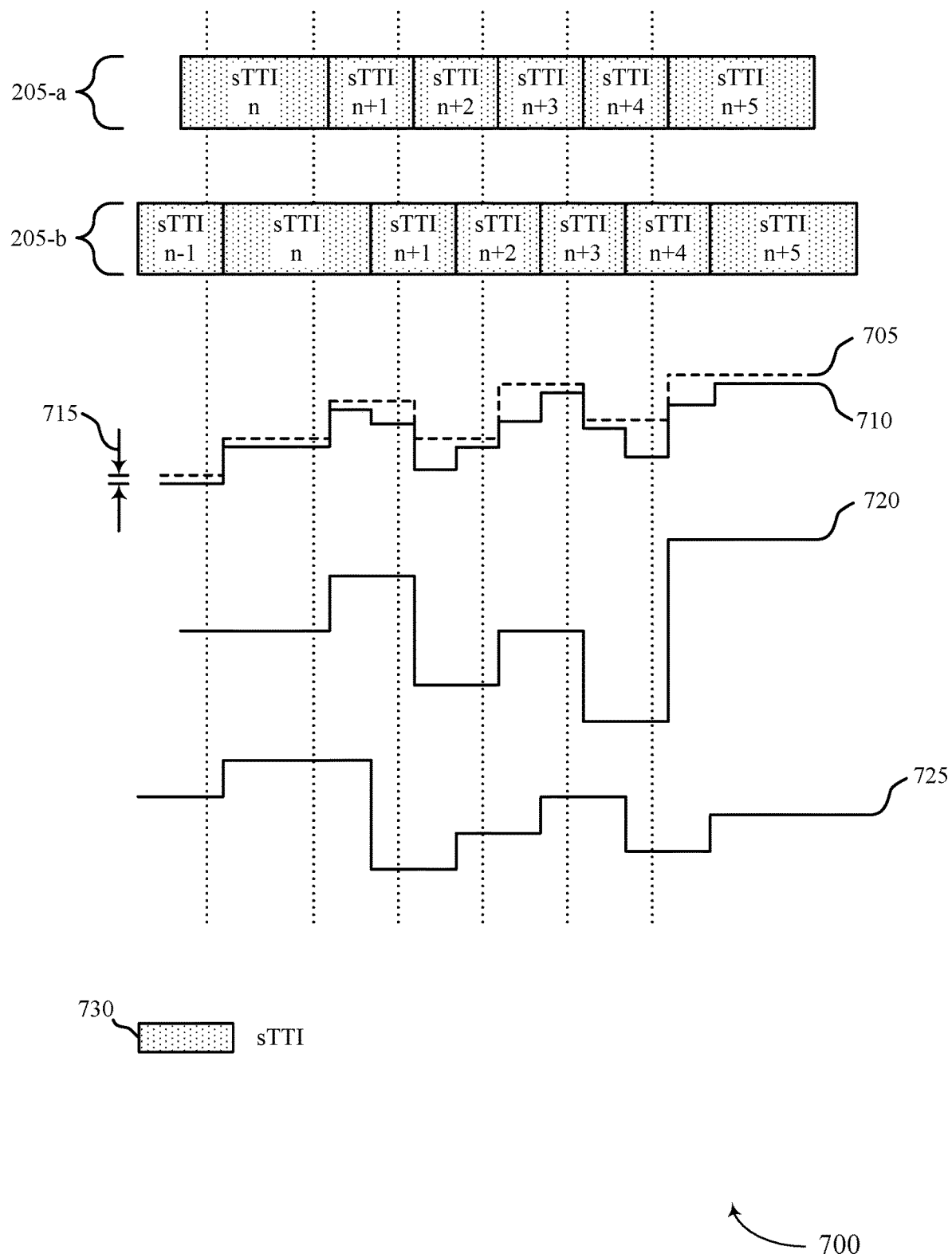
FIG. 7 illustrates multiple graphs showing the upper bounds for a maximum transmit power limit configured for uplink transmissions on multiple carriers in accordance with aspects of the present disclosure.

FIG. 7 illustrates multiple graphs 700 showing the upper bounds for a maximum transmit power limit configured for uplink transmissions on multiple carriers. Graph 725 illustrates example upper bounds for the maximum transmit power limit across sTTIs 730 on carrier 205-*b*, and graph 720 illustrates example upper bounds for the maximum transmit power limit across sTTIs 730 on carrier 205-*a*. UE 115-*a* may receive an indication from base station 105-*a* of the upper bound for the maximum transmit power limit during an sTTI prior to transmitting during the sTTI. To determine the upper bounds for the uplink transmissions on both carriers 205, UE 115-*a* may sum the upper bounds for overlapping sTTIs on the carriers 205. Graph 710 illustrates the upper bounds for the maximum transmit power limit for uplink transmissions on carriers 205 (i.e., the sum of graphs 720 and 725).

As shown in graph 710, the upper bounds for the maximum transmit power limit may vary within an sTTI on carrier 205-*a*. However, as discussed above, this may cause an uplink transmission during an sTTI on carrier 205-*a* to be distorted. As such, the techniques described herein may allow UE 115-*a* to maintain a maximum transmit power limit since the UE 115-*a* may only increase the upper bound for the limit for the duration of an uplink transmission on carrier 205-*a*. Graph 705 illustrates the upper bounds for the limit across the sTTIs on carrier 205-*b* in accordance with the techniques described herein. Graphs 705 and 710 are illustrated with an offset 715 to show the differences between these graphs. However, it is to be understood that portions of these graphs may overlap. In the present example, UE 115-*a* may determine an initial upper bound based on summing the upper bound for sTTI n+1 on carrier 205-*a* and the upper bound for sTTI n on carrier 205-*b*, and the UE 115-*a* may maintain this upper bound across the sTTIs on carrier 205-*b* overlapping with sTTI n+1 on carrier 205-*a*.

Figure 8:
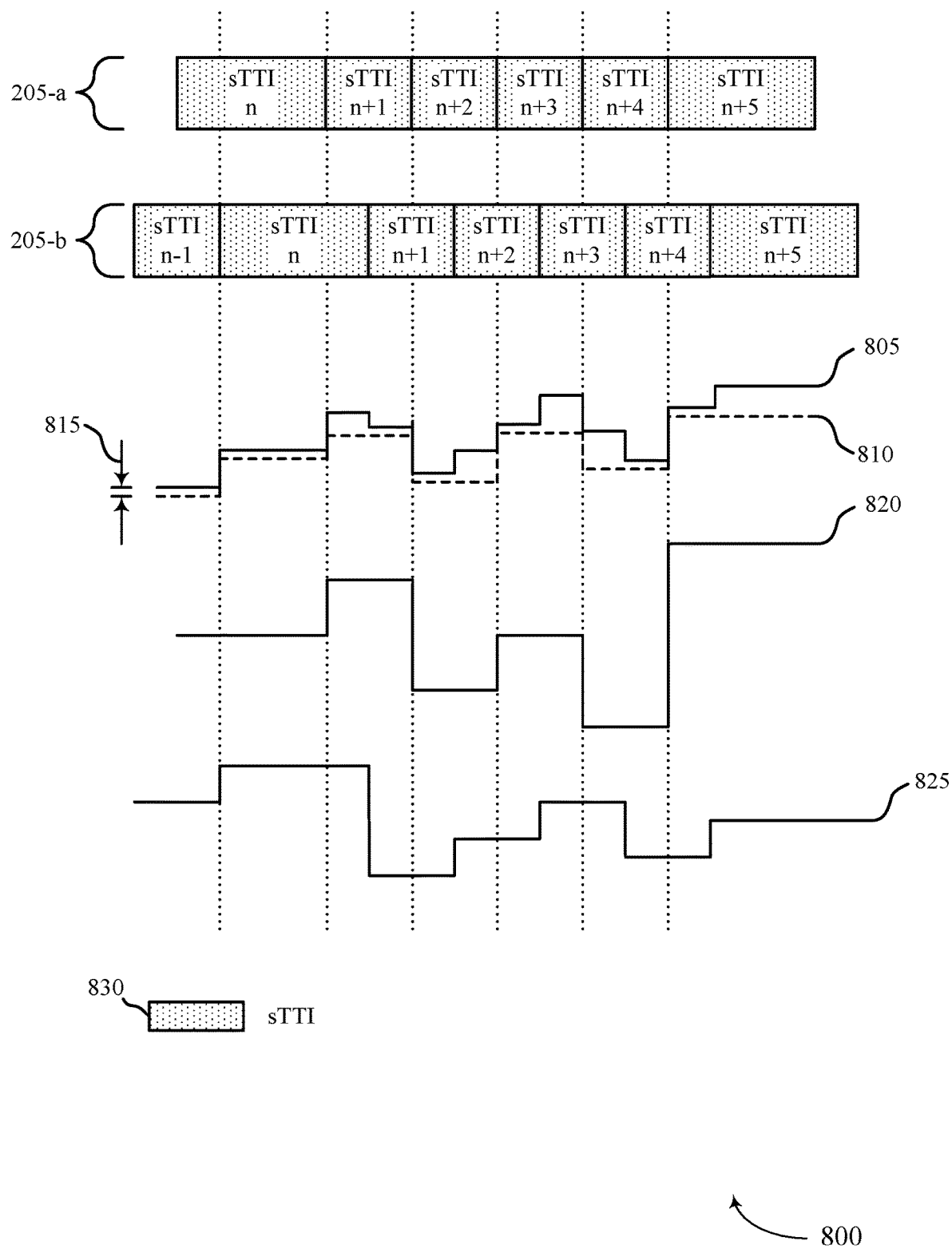
FIG. 8 illustrates multiple graphs showing the lower bounds for a maximum transmit power limit configured for uplink transmissions on multiple carriers in accordance with aspects of the present disclosure.

FIG. 8 illustrates multiple graphs 800 showing the lower bounds for a maximum transmit power limit configured for uplink transmissions on multiple carriers. Graph 825 illustrates example lower bounds for the maximum transmit power limit across sTTIs 830 on carrier 205-*b*, and graph 820 illustrates example lower bounds for the maximum transmit power limit across sTTIs 830 on carrier 205-*a*. UE 115-*a* may receive an indication from base station 105-*a* of the lower bound for the maximum transmit power limit during an sTTI prior to transmitting during the sTTI. To determine the lower bounds for the uplink transmissions on both carriers 205, UE 115-*a* may sum the lower bounds for overlapping sTTIs on the carriers 205. Graph 810 illustrates the lower bounds for the maximum transmit power limit for uplink transmissions on carriers 205 (i.e., the sum of graphs 820 and 825).

As shown in graph 810, the lower bounds for the maximum transmit power limit may vary within an sTTI on carrier 205-*a*. However, as discussed above, this may cause an uplink transmission during an sTTI on carrier 205-*a* to be distorted. As such, the techniques described herein may allow UE 115-*a* to maintain a maximum transmit power limit since the UE 115-*a* may only decrease the lower bound for the limit for the duration of an uplink transmission on carrier 205-*a*. Graph 805 illustrates the lower bounds for the limit across the sTTIs on carrier 205-*b* in accordance with the techniques described herein. Graphs 805 and 810 are illustrated with an offset 815 to show the differences between these graphs. However, it is to be understood that portions of these graphs may overlap. In the present example, UE 115-*a* may determine an initial lower bound based on summing the lower bound for sTTI n+1 and the lower bound for sTTI n, and the UE 115-*a* may maintain this lower bound across sTTI n and sTTI n+1 on carrier 205-*b* during sTTI n+1 on carrier 205-*a*.

The following equations may be used in accordance with the techniques described above with reference to FIGS. 2-8 to maintain a maximum transmit power limit during a TTI. For example, the configured maximum output power for an uplink transmission during a TTI k on a serving cell c(i) in a carrier group may be set within the following bounds:

$$PCMAX_{L,c(i),i(k)} \leq PCMAX_{c(i),i(k)} \leq PCMAX_{H,c(i),i(k)} \quad (1)$$

where $PCMAX_{L,c(i),i(k)}$ and $PCMAX_{H,c(i),i(k)}$ are the bounds for a serving cell c(i) of a carrier group. The total UE configured maximum output power PCMAX(p,q) in a first time interval p (e.g., one or more sTTIs, one or more slots, or one or more subframes) of carrier group 1 and a second time interval q (e.g., one or more sTTIs, one or more slots, or one or more subframes) of carrier group 2 that overlaps in time may be set within the following bounds:

$$PCMAX_{L,(p,q)} = MIN\{10 \log 10[pCMAX_{L,c(1),1(p)} + pCMAX_{L,c(2),2(q)}], PPowerClass\} \quad (2)$$

$$PCMAX_{H,(p,q)} = MIN\{10 \log 10[pCMAX_{H,c(1),1(p)} + pCMAX_{H,c(2),2(q)}], PPowerClass\} \quad (3)$$

where $PCMAX_{L,c(i),i}$ and $PCMAX_{H,c(i),i}$ are the respective bounds $PCMAX_{L,c(i),i(p)}$ and $PCMAX_{L,c(i),i(p)}$ expressed in a linear scale and PPowerClass is the nominal UE power. Equations (2) and (3) may thus be rewritten as the following (in the form of Equations (4) and (5):

$$PCMAX_{L,(p,q,k)} = MIN\{10 \log 10[pCMAX_{L,c(1),1(p)} + pCMAX_{L,c(2),2(q)} + pCMAX_{L,c(3),3(k)}], PPowerClass\} \quad (4)$$

$$PCMAX_{H,(p,q,k)} = MIN\{10 \log 10[pCMAX_{H,c(1),1(p)} + pCMAX_{H,c(2),2(q)} + pCMAX_{H,c(3),3(k)}], PPowerClass\} \quad (5)$$

In some cases, the measured total maximum output power PUMAX over both carrier groups may be:

$$PUMAX = 10 \log 10[pUMAX_{c(1),1} + pUMAX_{c(2),2}] \quad (6)$$

where $pUMAX_{c(1),i}$ denotes the measured output power of serving cell c(i) of carrier group i expressed in a linear scale.

Thus, based on the techniques described herein, if there are 'N' second time intervals being transmitted in a first time interval, then:

$$PCMAX_{L(p)} = MIN\{PCMAX_{L,p(0)}, PCMAX_{L,p(1)}, \ldots, PCMAX_{L,p(N)}\} \quad (7)$$

$$PCMAX_{H(p)} = MIN\{PCMAX_{H,p(0)}, PCMAX_{H,p(1)}, \ldots, PCMAX_{H,p(N)}\} \quad (8)$$

Further, if the UE is configured in carrier aggregation and synchronous or asynchronous transmissions:

$$PCMAX_{L(p)} - TLOW(PCMAX_{L(p)}) \leq PUMAX \leq PCMAX_{H(p)} + THIGH(PCMAX_{H(p)}) \quad (9)$$

where THIGH and TLOW correspond to high and low tolerances respectively.

Figure 9:
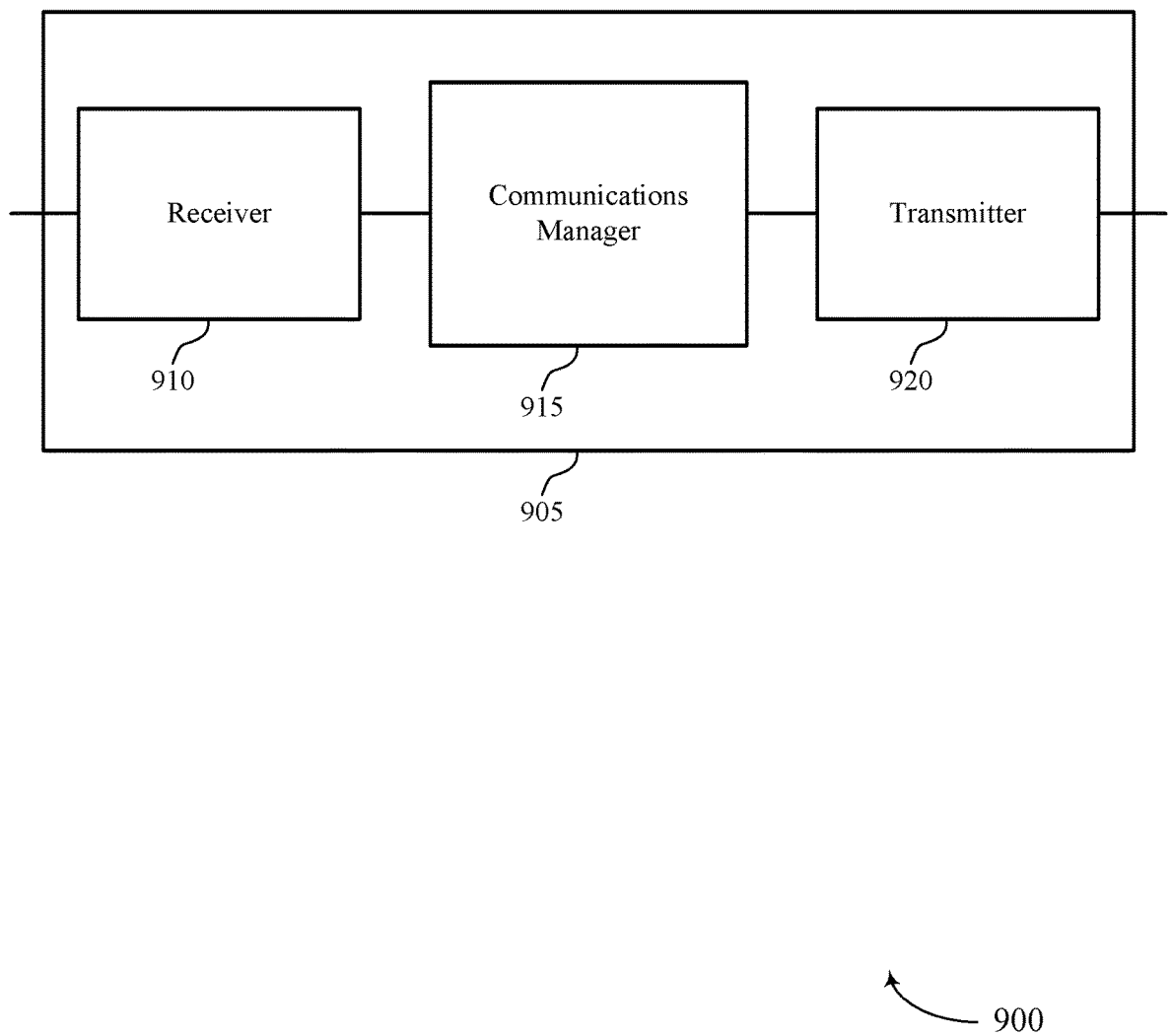
FIGS. 9-10 show block diagrams of a device that supports power limit determination for carrier aggregation with sTTIs in accordance with aspects of the present disclosure.

FIG. 9 shows a block diagram 900 of a wireless device 905 that supports power limit determination for carrier aggregation with sTTIs in accordance with aspects of the present disclosure. Wireless device 905 may be an example of aspects of a UE 115 as described herein. Wireless device 905 may include receiver 910, communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to power limit determination for carrier aggregation with sTTIs, etc.). Information may be passed on to other components of the device. The receiver 910 may be an example of aspects of the transceiver 1135 described with reference to FIG. 11. The receiver 910 may utilize a single antenna or a set of antennas.

Communications manager 915 may be an example of aspects of the communications manager 1115 described with reference to FIG. 11. Communications manager 915 and/or at least some of its various sub-components may be implemented in hardware, software executed by a processor, firmware, or any combination thereof. If implemented in software executed by a processor, the functions of the communications manager 915 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The communications manager 915 and/or at least some of its various sub-components may be physically located at various positions, including being distributed such that portions of functions are implemented at different physical locations by one or more physical devices. In some examples, communications manager 915 and/or at least some of its various sub-components may be a separate and distinct component in accordance with various aspects of the present disclosure. In other examples, communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 915 may identify that the UE is operating in a carrier aggregation mode that includes the use of at least a first component carrier that has a first TTI scheme and a second component carrier that has a second TTI scheme, at least one of the first TTI scheme or the second TTI scheme having a sTTI, select one of the first component carrier or the second component carrier as a reference component carrier and the other of the first component carrier or the second component carrier as a non-reference component carrier based on durations of TTIs in the first TTI scheme and the second TTI scheme, and determine a maximum UE transmit power limit for a duration of a slot, subframe, or sTTI in the reference component carrier based at least in part on a first sTTI of a plurality of sTTIs in the non-reference component carrier which overlap with the slot, subframe, or sTTI in the reference component carrier.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas. Transmitter 920 may transmit on the first component carrier and the second component carrier in compliance with the maximum UE transmit power limit.

Figure 10:
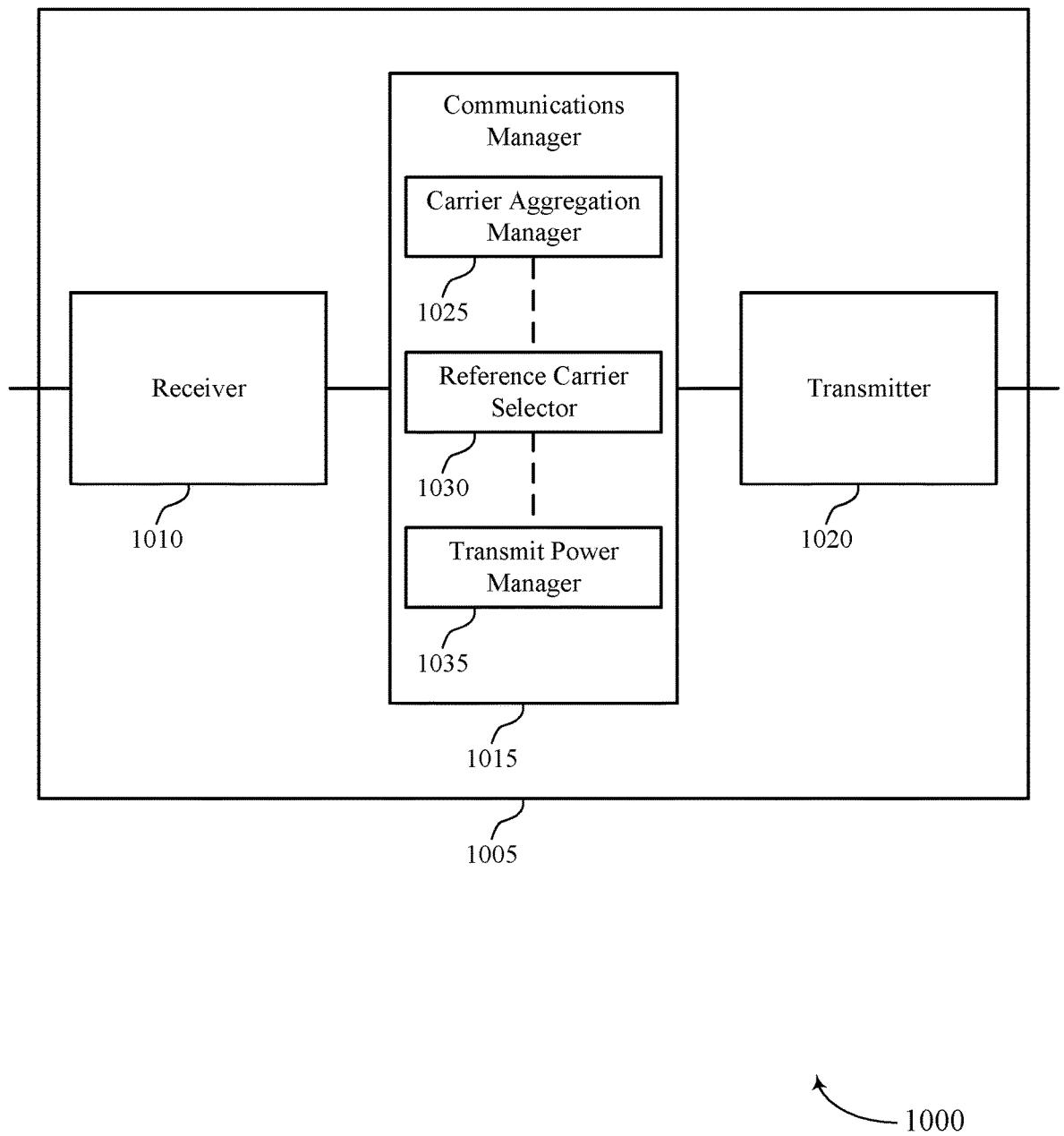

FIG. 10 shows a block diagram 1000 of a wireless device 1005 that supports power limit determination for carrier aggregation with sTTIs in accordance with aspects of the present disclosure. Wireless device 1005 may be an example of aspects of a wireless device 905 or a UE 115 as described with reference to FIG. 9. Wireless device 1005 may include receiver 1010, communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to power limit determination for carrier aggregation with sTTIs, etc.). Information may be passed on to other components of the device. The receiver 1010 may be an example of aspects of the transceiver 1135 described with reference to FIG. 11. The receiver 1010 may utilize a single antenna or a set of antennas.

Communications manager 1015 may be an example of aspects of the communications manager 1115 described with reference to FIG. 11. Communications manager 1015 may include carrier aggregation manager 1025, reference carrier selector 1030, and transmit power manager 1035.

Carrier aggregation manager 1025 may identify that the UE is operating in a carrier aggregation mode that includes the use of at least a first component carrier that has a first TTI scheme and a second component carrier that has a second TTI scheme, at least one of the first TTI scheme or the second TTI scheme having a sTTI. In some cases, the first component carrier and the second component carrier are time-aligned. In some cases, the first component carrier and the second component carrier are not time-aligned.

Reference carrier selector 1030 may select one of the first component carrier or the second component carrier as a reference component carrier and the other of the first component carrier or the second component carrier as a non-reference component carrier based on durations of TTIs in the first TTI scheme and the second TTI scheme. In some cases, selecting one of the first component carrier or the second component carrier as the reference component carrier includes selecting the reference component carrier based on a longest duration TTI of the first TTI scheme or of the second TTI scheme. In some cases, selecting one of the first component carrier or the second component carrier as the reference component carrier includes selecting a PCC as the reference component carrier based on the first TTI scheme including a two-symbol TTI and the second TTI scheme including a two-symbol TTI. In some cases, selecting one of the first component carrier or the second component carrier as the reference component carrier includes selecting an SCC as the reference component carrier based on the first TTI scheme including a two-symbol TTI and the second TTI scheme including a two-symbol TTI.

In some cases, the reference component carrier includes TTIs that are longer in duration than TTIs in the non-reference component carrier. In some cases, the reference component carrier includes a seven-symbol TTI or a one millisecond TTI and the non-reference component carrier includes a two-symbol TTI. In some cases, the reference component carrier includes a two-symbol TTI and the non-reference component carrier includes a two-symbol TTI.

Transmit power manager 1035 may determine a maximum UE transmit power limit for a duration of a slot, subframe, or sTTI in the reference component carrier based at least in part on a first sTTI of a plurality of sTTIs in the non-reference component carrier which overlap with the slot, subframe, or sTTI in the reference component carrier. In some cases, determining the maximum UE transmit power limit includes evaluating a first slot of the reference component carrier and the first sTTI of the non-reference component carrier, where the first slot of the reference component carrier and the first sTTI of the non-reference component carrier overlap in time.

In some cases, evaluating the first slot of the reference component carrier and the first sTTI of the non-reference component carrier includes determining a sum of a first maximum UE transmit power limit for the first slot of the reference component carrier and a second maximum UE transmit power limit for the first sTTI of the non-reference component carrier, where the maximum UE transmit power limit is the sum. In some cases, transmit power manager 1035 may update the maximum UE transmit power limit by evaluating the first slot of the reference component carrier, the first sTTI of the non-reference component carrier, and additional sTTIs of the non-reference component carrier, where the first slot of the reference component carrier, the first sTTI of the non-reference component carrier, and the additional sTTIs of the non-reference component carrier each overlap in time.

In some cases, updating the maximum UE transmit power limit includes determining a first sum of a first maximum UE transmit power limit for the first slot of the reference component carrier and a second maximum UE transmit power limit for the first sTTI of the non-reference component carrier. In some cases, transmit power manager 1035 may determine one or more second sums, each of the one or more second sums being of the first maximum UE transmit power limit for the first slot of the reference component carrier and an additional maximum UE transmit power limit for corresponding additional sTTIs of the non-reference component carrier. In some cases, transmit power manager 1035 may determine a maximum sum of the first sum and the one or more second sums, where the maximum UE transmit power limit is the maximum sum.

In some cases, determining the maximum UE transmit power limit includes evaluating a first sTTI of the reference component carrier and the first sTTI of the non-reference component carrier, where the first sTTI of the reference component carrier and the first sTTI of the non-reference component carrier overlap in time. In some cases, evaluating the first sTTI of the reference component carrier and the first sTTI of the non-reference component carrier includes determining a sum of a first maximum UE transmit power limit for the first sTTI of the reference component carrier and a second maximum UE transmit power limit for the first sTTI of the non-reference component carrier, where the maximum UE transmit power limit is the sum.

In some cases, transmit power manager 1035 may update the maximum UE transmit power limit by evaluating the first sTTI of the reference component carrier, the first sTTI of the non-reference component carrier, and additional sTTIs of the non-reference component carrier, where the first sTTI of the reference component carrier, the first sTTI of the non-reference component carrier, and the additional sTTIs of the non-reference component carrier each overlap in time.

In some cases, updating the maximum UE transmit power limit includes determining a first sum of a first maximum UE transmit power limit for the first sTTI of the reference component carrier and a second maximum UE transmit power limit for the first sTTI of the non-reference component carrier. In some cases, transmit power manager 1035 may determine one or more second sums, each of the one or more second sums being of the first maximum UE transmit power limit for the first sTTI of the reference component carrier and an additional maximum UE transmit power limit for corresponding additional sTTIs of the non-reference component carrier. In some cases, transmit power manager 1035 may determine a maximum sum of the first sum and the one or more second sums, where the maximum UE transmit power limit is the maximum sum.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1135 described with reference to FIG. 11. The transmitter 1020 may utilize a single antenna or a set of antennas.

Figure 11:
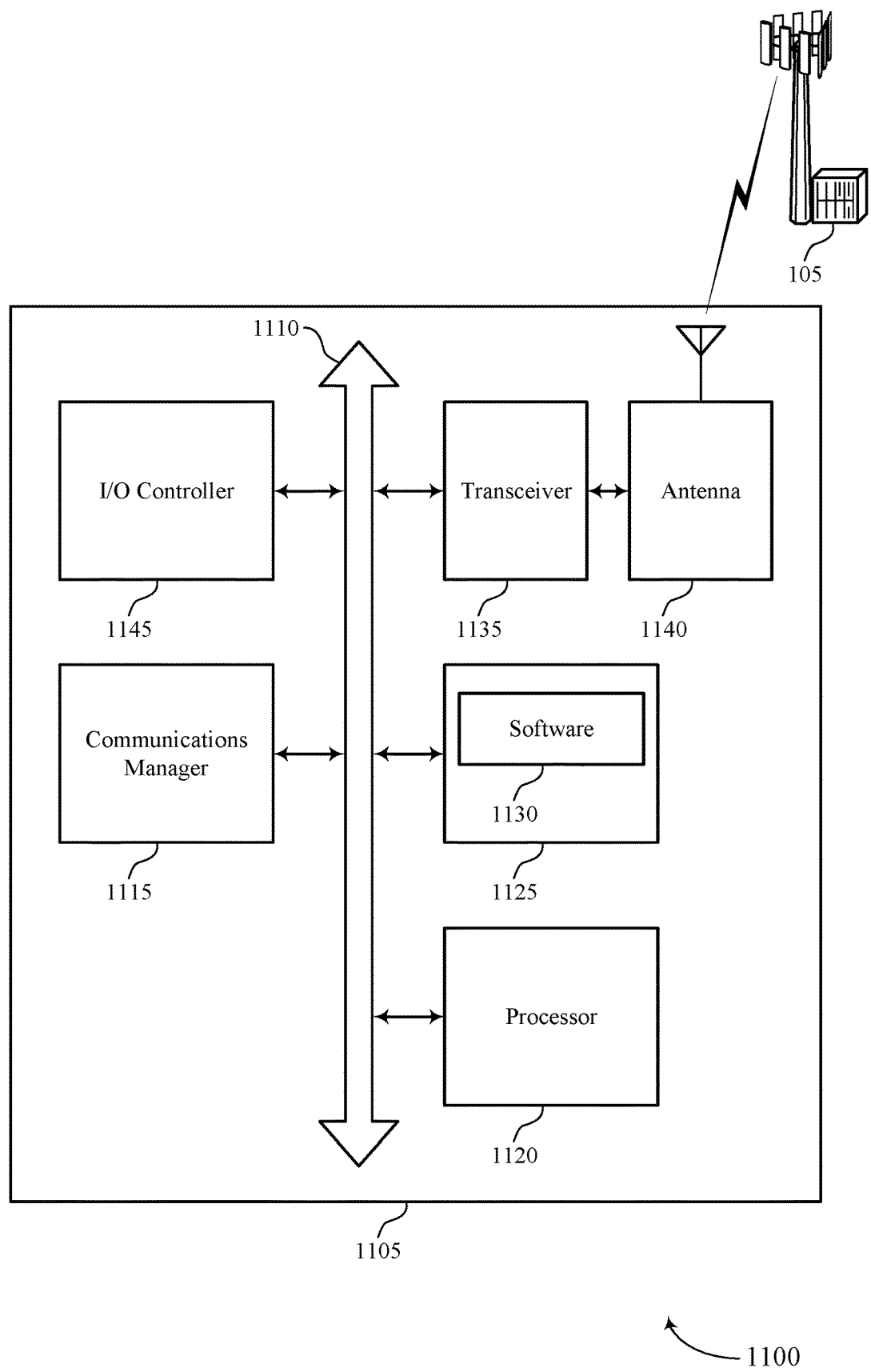
FIG. 11 illustrates a block diagram of a system including a user equipment (UE) that supports power limit determination for carrier aggregation with sTTIs in accordance with aspects of the present disclosure.

FIG. 11 shows a diagram of a system 1100 including a device 1105 that supports power limit determination for carrier aggregation with sTTIs in accordance with aspects of the present disclosure. Device 1105 may be an example of or include the components of wireless device 905, wireless device 1005, or a UE 115 as described above, e.g., with reference to FIGS. 9 and 10. Device 1105 may include components for bi-directional voice and data communications including components for transmitting and receiving communications, including communications manager 1115, processor 1120, memory 1125, software 1130, transceiver 1135, antenna 1140, and I/O controller 1145. These components may be in electronic communication via one or more buses (e.g., bus 1110). Device 1105 may communicate wirelessly with one or more base stations 105.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting power limit determination for carrier aggregation with sTTIs).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware or software operation such as the interaction with peripheral components or devices.

Software 1130 may include code to implement aspects of the present disclosure, including code to support power limit determination for carrier aggregation with sTTIs. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
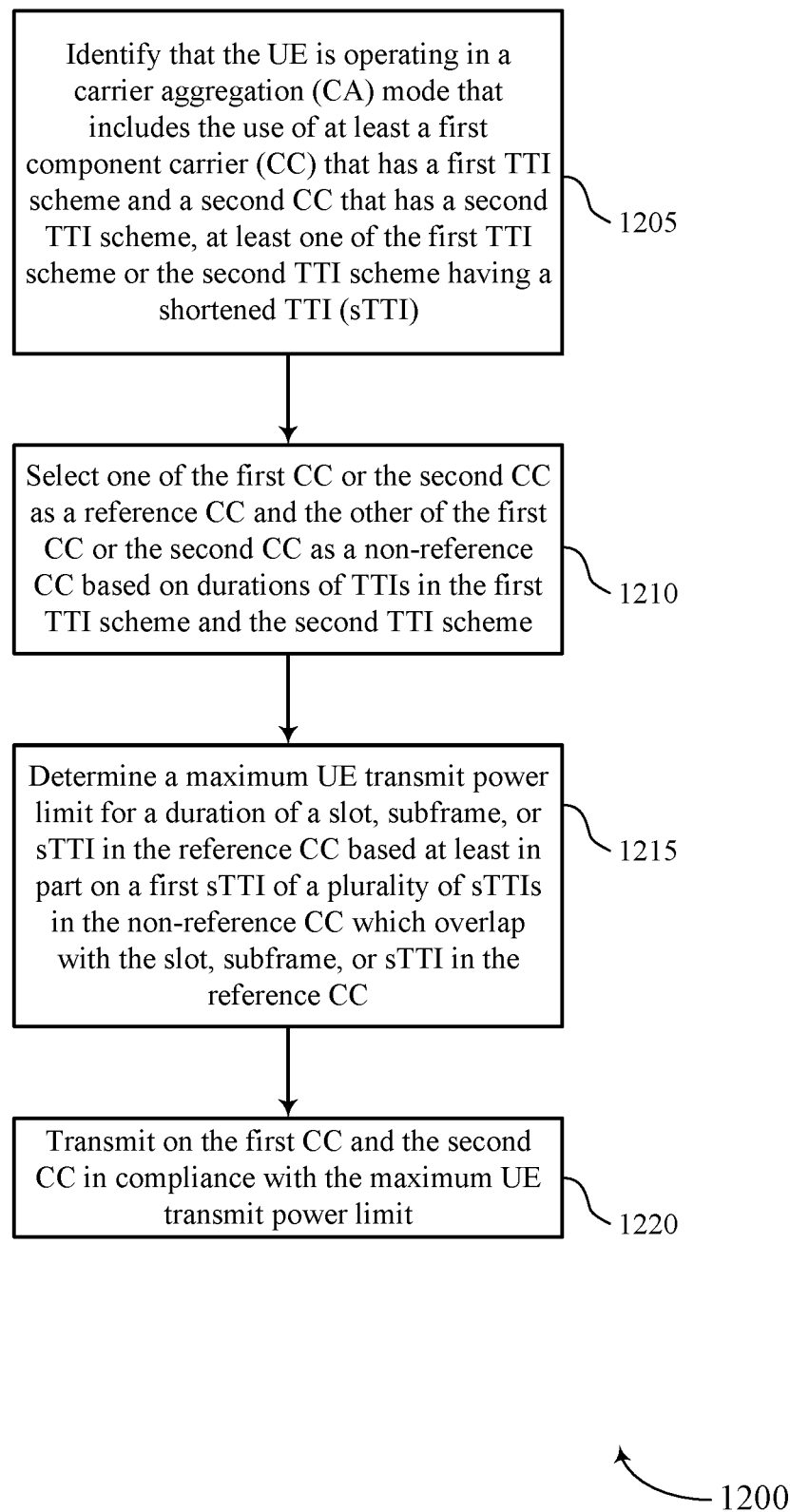
FIGS. 12-14 illustrate methods for power limit determination for carrier aggregation with sTTIs in accordance with aspects of the present disclosure.

FIG. 12 shows a flowchart illustrating a method 1200 for power limit determination for carrier aggregation with sTTIs in accordance with aspects of the present disclosure. The operations of method 1200 may be implemented by a UE 115 or its components as described herein. For example, the operations of method 1200 may be performed by a communications manager as described with reference to FIGS. 9 through 11. In some examples, a UE 115 may execute a set of codes to control the functional elements of the device to perform the functions described below. Additionally or alternatively, the UE 115 may perform aspects of the functions described below using special-purpose hardware.

At block 1205 the UE 115 may identify that the UE is operating in a carrier aggregation mode that includes the use of at least a first component carrier that has a first TTI scheme and a second component carrier that has a second TTI scheme, at least one of the first TTI scheme or the second TTI scheme having a sTTI. The operations of block 1205 may be performed according to the methods described herein. In certain examples, aspects of the operations of block 1205 may be performed by a carrier aggregation manager as described with reference to FIGS. 9 through 11.

At block 1210 the UE 115 may select one of the first component carrier or the second component carrier as a reference component carrier and the other of the first component carrier or the second component carrier as a non-reference component carrier based at least in part on durations of TTIs in the first TTI scheme and the second TTI scheme. The operations of block 1210 may be performed according to the methods described herein. In certain examples, aspects of the operations of block 1210 may be performed by a reference carrier selector as described with reference to FIGS. 9 through 11.

At block 1215 the UE 115 may determine a maximum UE transmit power limit for a duration of a slot, subframe, or sTTI in the reference component carrier based at least in part on a first sTTI of a plurality of sTTIs in the non-reference component carrier which overlap with the slot, subframe, or sTTI in the reference component carrier. The operations of block 1215 may be performed according to the methods described herein. In certain examples, aspects of the operations of block 1215 may be performed by a transmit power manager as described with reference to FIGS. 9 through 11.

At block 1220 the UE 115 may transmit on the first component carrier and the second component carrier in compliance with the maximum UE transmit power limit. The operations of block 1220 may be performed according to the methods described herein. In certain examples, aspects of the operations of block 1220 may be performed by a transmitter as described with reference to FIGS. 9 through 11.

Figure 13:
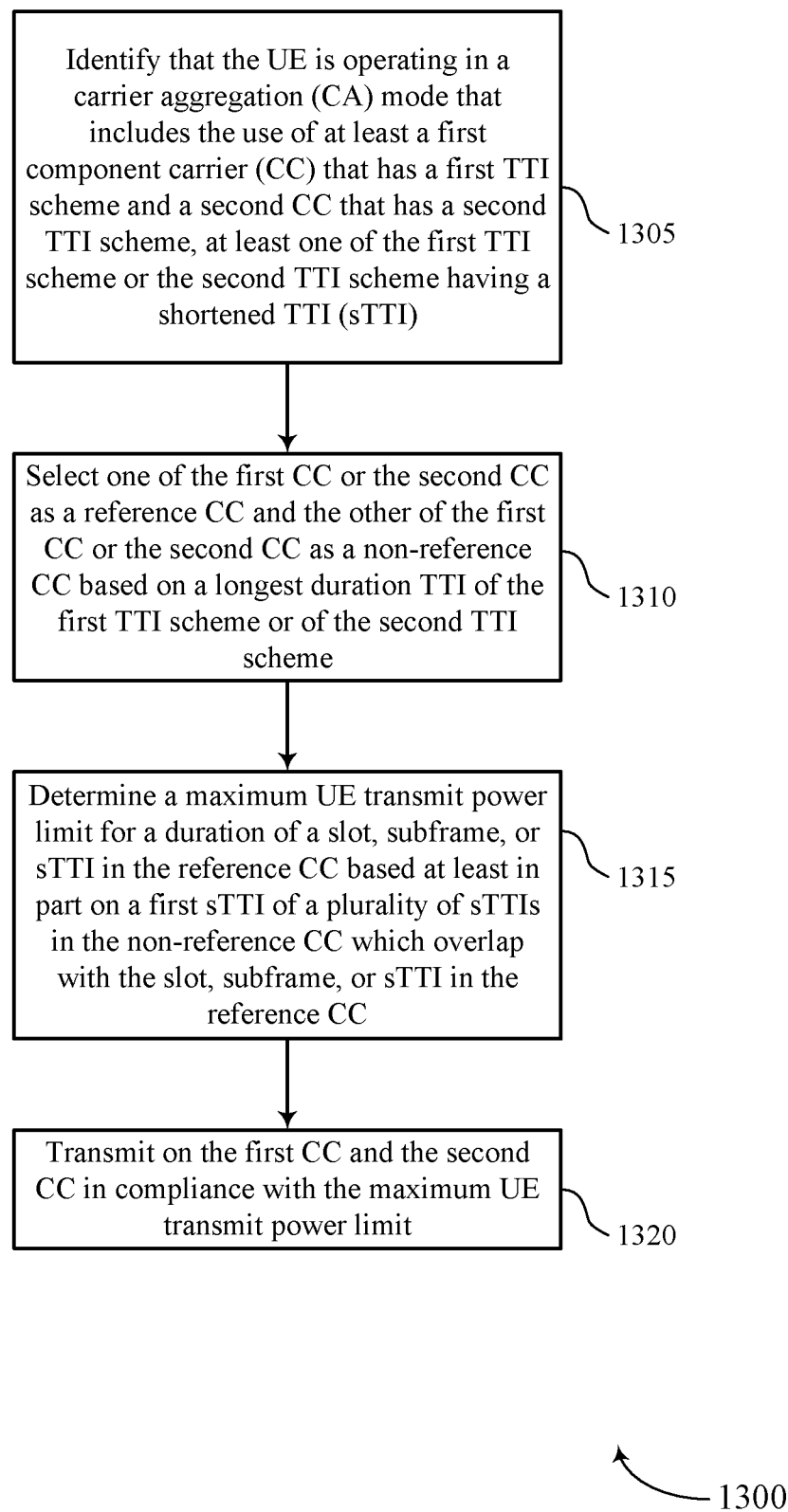

FIG. 13 shows a flowchart illustrating a method 1300 for power limit determination for carrier aggregation with sTTIs in accordance with aspects of the present disclosure. The operations of method 1300 may be implemented by a UE 115 or its components as described herein. For example, the operations of method 1300 may be performed by a communications manager as described with reference to FIGS. 9 through 11. In some examples, a UE 115 may execute a set of codes to control the functional elements of the device to perform the functions described below. Additionally or alternatively, the UE 115 may perform aspects of the functions described below using special-purpose hardware.

At block 1305 the UE 115 may identify that the UE is operating in a carrier aggregation mode that includes the use of at least a first component carrier that has a first TTI scheme and a second component carrier that has a second TTI scheme, at least one of the first TTI scheme or the second TTI scheme having a sTTI. The operations of block 1305 may be performed according to the methods described herein. In certain examples, aspects of the operations of block 1305 may be performed by a carrier aggregation manager as described with reference to FIGS. 9 through 11.

At block 1310 the UE 115 may select one of the first component carrier or the second component carrier as a reference component carrier and the other of the first component carrier or the second component carrier as a non-reference component carrier based on a longest duration TTI of the first TTI scheme or of the second TTI scheme. The operations of block 1310 may be performed according to the methods described herein. In certain examples, aspects of the operations of block 1310 may be performed by a reference carrier selector as described with reference to FIGS. 9 through 11.

At block 1315 the UE 115 may determine a maximum UE transmit power limit for a duration of a slot, subframe, or sTTI in the reference component carrier based at least in part on a first sTTI of a plurality of sTTIs in the non-reference component carrier which overlap with the slot, subframe, or sTTI in the reference component carrier. The operations of block 1315 may be performed according to the methods described herein. In certain examples, aspects of the operations of block 1315 may be performed by a transmit power manager as described with reference to FIGS. 9 through 11.

At block 1320 the UE 115 may transmit on the first component carrier and the second component carrier in compliance with the maximum UE transmit power limit. The operations of block 1320 may be performed according to the methods described herein. In certain examples, aspects of the operations of block 1320 may be performed by a transmitter as described with reference to FIGS. 9 through 11.

Figure 14:
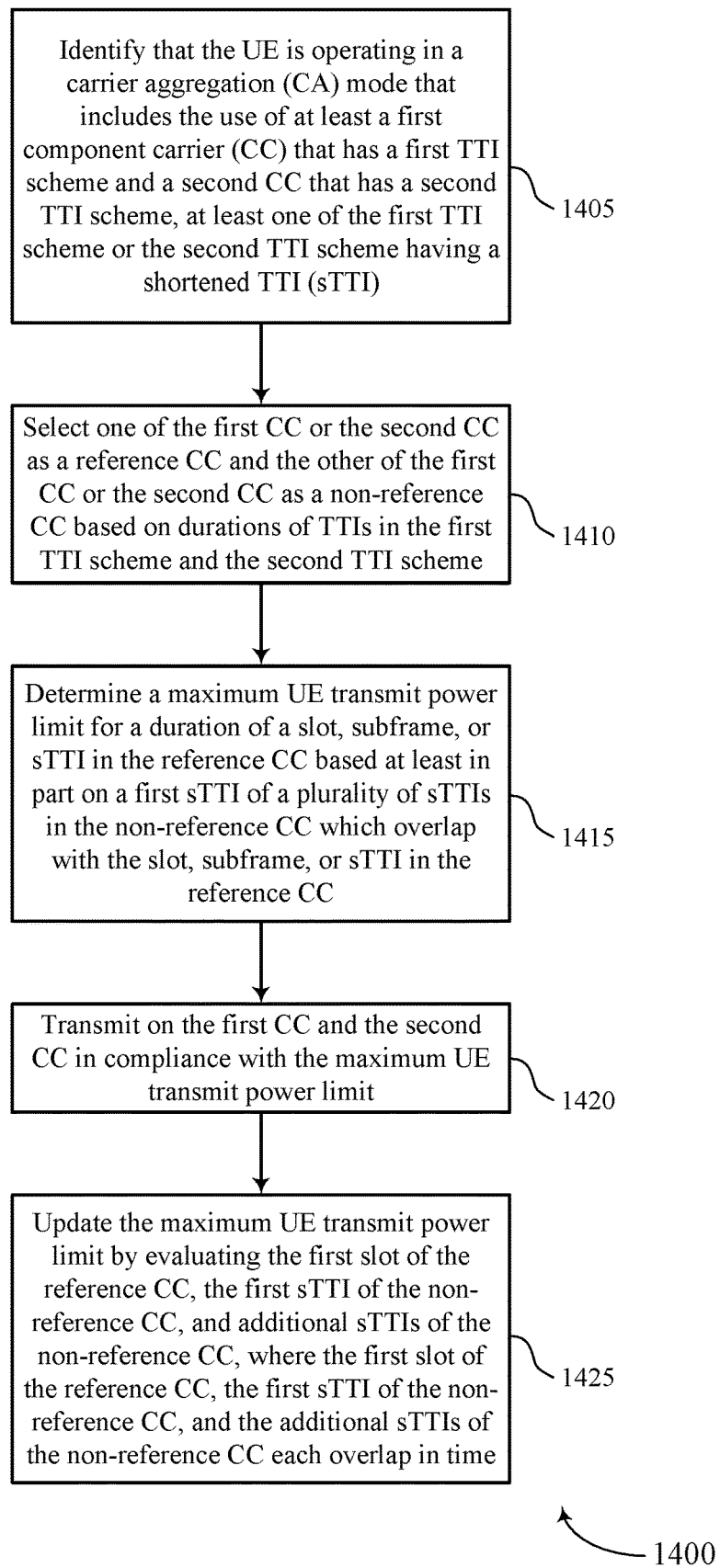

FIG. 14 shows a flowchart illustrating a method 1400 for power limit determination for carrier aggregation with sTTIs in accordance with aspects of the present disclosure. The operations of method 1400 may be implemented by a UE 115 or its components as described herein. For example, the operations of method 1400 may be performed by a communications manager as described with reference to FIGS. 9 through 11. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may identify that the UE is operating in a carrier aggregation mode that includes the use of at least a first component carrier that has a first TTI scheme and a second component carrier that has a second TTI scheme, at least one of the first TTI scheme or the second TTI scheme having a sTTI. The operations of block 1405 may be performed according to the methods described herein. In certain examples, aspects of the operations of block 1405 may be performed by a carrier aggregation manager as described with reference to FIGS. 9 through 11.

At block 1410 the UE 115 may select one of the first component carrier or the second component carrier as a reference component carrier and the other of the first component carrier or the second component carrier as a non-reference component carrier based at least in part on durations of TTIs in the first TTI scheme and the second TTI scheme. The operations of block 1410 may be performed according to the methods described herein. In certain examples, aspects of the operations of block 1410 may be performed by a reference carrier selector as described with reference to FIGS. 9 through 11.

At block 1415 the UE 115 may determine a maximum UE transmit power limit for a duration of a slot, subframe, or sTTI in the reference component carrier based at least in part on a first sTTI of a plurality of sTTIs in the non-reference component carrier which overlap with the slot, subframe, or sTTI in the reference component carrier. In some cases, determining the maximum UE transmit power includes evaluating a first slot of the reference component carrier and a first sTTI of a non-reference component carrier, where the first slot of the reference component carrier and the first sTTI of the non-reference component carrier overlap in time, and where the non-reference component carrier is the first component carrier or the second component carrier that is different from the reference component carrier. The operations of block 1415 may be performed according to the methods described herein. In certain examples, aspects of the operations of block 1415 may be performed by a transmit power manager as described with reference to FIGS. 9 through 11.

At block 1420 the UE 115 may transmit on the first component carrier and the second component carrier in compliance with the maximum UE transmit power limit. The operations of block 1420 may be performed according to the methods described herein. In certain examples, aspects of the operations of block 1420 may be performed by a transmitter as described with reference to FIGS. 9 through 11.

At block 1425 the UE 115 may update the maximum UE transmit power limit by evaluating the first slot of the reference component carrier, the first sTTI of the non-reference component carrier, and additional sTTIs of the non-reference component carrier, wherein the first slot of the reference component carrier, the first sTTI of the non-reference component carrier, and the additional sTTIs of the non-reference component carrier each overlap in time. The operations of block 1425 may be performed according to the methods described herein. In certain examples, aspects of the operations of block 1425 may be performed by a transmit power manager as described with reference to FIGS. 9 through 11.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    determining a maximum transmit power limit for a duration of a first transmission time interval (TTI) based on a transmit power at a boundary of the first TTI where a second TTI overlaps the first TTI and not based on transmission powers after the boundary,
    in a mode comprising the first TTI transmitting on a first component carrier (CC) and the second TTI transmitting on a second CC, at least one of the first TTI or the second TTI being a short TTI; and
    transmitting on the first CC and the second CC in compliance with the maximum transmit power limit.

2. An apparatus for wireless communication at a user equipment (UE), comprising:
    means for determining a maximum transmit power limit for a duration of a first transmission time interval (TTI) based on a transmit power at a boundary of the first TTI where a second TTI overlaps the first TTI and not based on transmission powers after the boundary,
    in a mode comprising the first TTI transmitting on a first component carrier (CC) and the second TTI transmitting on a second CC, at least one of the first TTI or the second TTI being a short TTI; and
    means for transmitting on the first CC and the second CC in compliance with the maximum transmit power limit.

3. A mobile device for wireless communication, comprising:
    a processor;
    memory in electronic communication with the processor; and
    instructions stored in the memory and operable, when executed by the processor, to cause the mobile device to:
        determine a maximum transmit power limit for a duration of a first transmission time interval (TTI) based on a transmit power at a boundary of the first TTI where a second TTI overlaps the first TTI and not based on transmission powers after the boundary,
        in a mode comprising the first TTI transmitting on a first component carrier (CC) and the second TTI transmitting on a second CC, at least one of the first TTI or the second TTI being a short TTI; and
        transmit on the first CC and the second CC in compliance with the maximum transmit power limit.

4. A non-transitory computer readable medium storing code for wireless communication at a user equipment (UE), the code comprising instructions executable by a processor to:
    determine a maximum transmit power limit for a duration of a first transmission time interval (TTI) based on a transmit power at a boundary of the first TTI where the second TTI overlaps the first TTI and not based on transmission powers after the boundary,
    in a mode comprising the first TTI transmitting on a first component carrier (CC) and the second TTI transmitting on a second CC, at least one of the first TTI or the second TTI being a short TTI; and
    transmit on the first CC and the second CC in compliance with the maximum transmit power limit.

* * * * *